United States Patent
Nuttall et al.

(10) Patent No.: US 10,306,442 B1
(45) Date of Patent: May 28, 2019

(54) DEVICES AND METHODS FOR SPECIALIZED MACHINE-TO-MACHINE COMMUNICATION TRANSMISSION NETWORK MODES VIA EDGE NODE CAPABILITIES

(71) Applicant: Skylo Technologies Inc., Palo Alto, CA (US)

(72) Inventors: Andrew Nuttall, Stanford, CA (US); Parthsarathi Trivedi, Palo Alto, CA (US); Andrew Kalman, Stanford, CA (US)

(73) Assignee: SKYLO TECHNOLOGIES INC., Palo Alto, CA (US)

( * ) Notice: Subject to any disclaimer, the term of this patent is extended or adjusted under 35 U.S.C. 154(b) by 0 days.

(21) Appl. No.: 15/872,761

(22) Filed: Jan. 16, 2018

(51) Int. Cl.
*H04W 4/70* (2018.01)
*H04L 29/08* (2006.01)
*H04W 40/02* (2009.01)

(52) U.S. Cl.
CPC .......... *H04W 4/70* (2018.02); *H04L 67/1097* (2013.01); *H04L 67/2842* (2013.01); *H04W 40/02* (2013.01)

(58) Field of Classification Search
None
See application file for complete search history.

(56) References Cited

U.S. PATENT DOCUMENTS

| 6,046,980 A | 4/2000 | Packer et al. |
| 8,185,629 B2 | 5/2012 | Hoeksel |
| 8,620,336 B2 | 12/2013 | Golaup et al. |

(Continued)

FOREIGN PATENT DOCUMENTS

| KR | 20090029464 A | 3/2009 |
| WO | WO-2016096978 A1 | 6/2016 |

(Continued)

OTHER PUBLICATIONS

U.S. Appl. No. 15/795,026 Office Action dated Feb. 23, 2018.
(Continued)

*Primary Examiner* — Faruk Hamza
*Assistant Examiner* — Cassandra L Decker
(74) *Attorney, Agent, or Firm* — Wilson Sonsini Goodrich & Rosati

(57) ABSTRACT

Disclosed herein are hub devices for a machine-to-machine (M2M) communications network that enables multiple communication modes for data source nodes, the hub comprising a processor, a local connectivity system configured to communicate data with the data source nodes via an interface, a data processing and caching system comprising a local memory and configured to receive and store user-defined data routing and processing functions, prioritize the data based on the user-defined functions; and route the prioritized data to the local memory for storage or to the data transmission system for immediate transmission based on the priority, and a data transmission system configured to dynamically assign an M2M upload mechanism to the routed data selected from: a real-time transmission mechanism, a fixed interval mechanism, a data backhaul mechanism, and a user pull mechanism; and transmit the data to a network backhaul link for delivery to a host point.

29 Claims, 13 Drawing Sheets

(56) References Cited

U.S. PATENT DOCUMENTS

| | | | |
|---|---|---|---|
| 9,154,994 B2 | 10/2015 | Fox et al. | |
| 9,288,611 B2 | 3/2016 | Miller, II et al. | |
| 9,300,453 B2 | 3/2016 | Kaczmarska-Wojtania et al. | |
| 9,407,575 B2 | 8/2016 | Herriot et al. | |
| 9,473,514 B1* | 10/2016 | Chou | H04W 4/70 |
| 9,635,057 B2 | 4/2017 | Bone et al. | |
| 9,736,553 B2 | 8/2017 | Shaw et al. | |
| 9,838,258 B2 | 12/2017 | Wang et al. | |
| 9,848,279 B2 | 12/2017 | Cui et al. | |
| 9,860,677 B1* | 1/2018 | Agerstam | H04W 4/70 |
| 9,860,906 B2 | 1/2018 | Shaw et al. | |
| 9,866,637 B2 | 1/2018 | Doraiswamy et al. | |
| 2002/0103803 A1 | 8/2002 | Chantrain et al. | |
| 2002/0124094 A1 | 9/2002 | Chang et al. | |
| 2002/0175938 A1 | 11/2002 | Hackworth | |
| 2003/0033519 A1* | 2/2003 | Buckman | H04L 67/2823 713/153 |
| 2004/0149918 A1 | 8/2004 | Craig et al. | |
| 2007/0081468 A1 | 4/2007 | Timus et al. | |
| 2008/0259919 A1* | 10/2008 | Monga | H04L 43/12 370/389 |
| 2008/0276003 A1 | 11/2008 | Dudley et al. | |
| 2011/0045818 A1 | 2/2011 | Banks et al. | |
| 2011/0191011 A1 | 8/2011 | McBride et al. | |
| 2011/0255445 A1 | 10/2011 | Johnson et al. | |
| 2012/0198222 A1 | 8/2012 | Tukol et al. | |
| 2013/0182566 A1* | 7/2013 | Goergen | H04L 1/1628 370/230 |
| 2013/0215867 A1 | 8/2013 | Gomez et al. | |
| 2014/0128088 A1 | 5/2014 | Farhadi | |
| 2014/0162677 A1 | 6/2014 | De Pasquale et al. | |
| 2014/0237080 A1* | 8/2014 | Stanwood | H04W 40/22 709/218 |
| 2015/0200809 A1* | 7/2015 | Wittenschlaeger | H04L 41/0806 370/401 |
| 2015/0241873 A1* | 8/2015 | Goldenberg | G05B 19/048 700/97 |
| 2015/0312277 A1* | 10/2015 | Rane | G06F 21/6218 726/1 |
| 2016/0098305 A1 | 4/2016 | Bucsa et al. | |
| 2016/0164831 A1* | 6/2016 | Kim | H04L 43/08 709/223 |
| 2016/0198471 A1 | 7/2016 | Young et al. | |
| 2017/0064731 A1* | 3/2017 | Wang | H04W 72/1263 |
| 2017/0078826 A1 | 3/2017 | Cui et al. | |
| 2017/0083312 A1* | 3/2017 | Pindado | H04W 4/70 |
| 2017/0086054 A1* | 3/2017 | Azevedo | H04W 4/02 |
| 2017/0105131 A1* | 4/2017 | Song | H04W 4/70 |
| 2017/0163444 A1* | 6/2017 | McLaughlin | H04L 12/66 |
| 2017/0188389 A1* | 6/2017 | Takahashi | H04W 48/12 |
| 2017/0215023 A1 | 7/2017 | Ly et al. | |
| 2017/0257289 A1 | 9/2017 | Cui et al. | |
| 2017/0318117 A1* | 11/2017 | Stenneth | H04L 67/322 |

FOREIGN PATENT DOCUMENTS

| | | | |
|---|---|---|---|
| WO | WO-2016139408 A1 | 9/2016 | |
| WO | WO-2016142684 A1 | 9/2016 | |
| WO | WO-2017064565 A1 | 4/2017 | |
| WO | WO-2017081490 A1 | 5/2017 | |

OTHER PUBLICATIONS

Co-pending U.S. Appl. No. 15/795,026, filed Oct. 26, 2017.
U.S. Appl. No. 15/795,026 Office Action dated Jul. 19, 2018.
U.S. Appl. No. 15/795,026 Office Action dated Dec. 14, 2018.
PCT/US2018/057507 International Search Report and Written Opinion dated Feb. 12, 2019.
U.S. Appl. No. 15/795,026 Office Action dated Mar. 18, 2019.

* cited by examiner

DEVICES AND METHODS FOR SPECIALIZED MACHINE-TO-MACHINE COMMUNICATION TRANSMISSION NETWORK MODES VIA EDGE NODE CAPABILITIES

BACKGROUND OF THE INVENTION

With the proliferation of smart devices and the creation of the Internet of Things (IoT), there is a rapidly increasing demand for Internet accessibility and capability for embedded devices. Traditional communication network architectures have been designed around human-to-human (H2H) communication modes. The implication of this design priority is that network operating procedures, network operations servers, and user edge nodes are all designed for low latency requirements, large amounts of data, unpredictable data flows, and ample processing capabilities on the user device side of the network. These design requirements contrast sharply with the data and usage profiles of machine-to-machine (M2M) communications, which are typically small amounts of generally predictable data from devices.

SUMMARY OF THE INVENTION

The present disclosure relates to increasing network efficiency and endpoint capabilities by adding complementary functionality in user network transceivers.

Traditional communication network architectures have been designed around human-to-human (H2H) communication modes. The implication of this design priority is that network operating procedures, network operations servers (NOSs), and user edge nodes are all designed for low latency requirements, large amounts of data, unpredictable data flows, and ample processing capabilities on the user device side of the network. These design requirements contrast sharply with the data and usage profiles of machine-to-machine (M2M) communications, which are typically relatively small amounts of generally predictable data from devices.

In traditional H2H communication traffic for satellite network connectivity, geosynchronous satellite-based data or internet providers rely upon very-small-aperture terminals (VSAT) systems to receive and transmit information. The design of these terminals has been based around high bandwidth use cases, specifically for maximizing data transmission rates, exclusive support of unscheduled transmissions, and no additional data processing. Large directional antennas and powerful emitters are typically required to close the link budget on these wide bandwidth/high data rate systems. The requirements for a directional antenna and the high speed data processing electronics significantly increase the material costs and overhead for these satellite systems, limiting their ability to be easily deployed in mass.

With the continued proliferation of smart devices and sensors, there is an urgent and unmet need for new network architectures that meet the ever growing bandwidth requirements of the internet of things. In some embodiments, the present disclosure includes devices and methods that enable specialized M2M network communication modes and capabilities via the edge node. In some embodiments, M2M communications have a spectrum of latency and performance requirements, for which networks can be optimized via communication modes and protocols. In some embodiments, increased network performance requires a synchronized optimization of the user edge nodes, the data backhaul network, and/or the network operations server (NOS). In some embodiments, the user edge node capabilities, or equivalently herein, the hub capabilities herein include functionality required to deliver specialized M2M communication modes while simultaneously augmenting IoT capabilities.

In some cases, a hub is an edge node that connects one or many devices to a host point, and/or the Internet, either directly or via a network base station. In some cases, the hub collects, tags, processes, and routes all incoming device data before relaying it to its desired endpoint. In some cases, devices route data through the hub like a generic network switch. In some embodiments, devices route data through the hub using a Representational State Transfer (REST) API on the hub to access more specialized functionality. The API may allow for data to be routed to local caches on the hub for temporary or indefinite storage; it may allow for incoming data to be processed by user-defined functions to reduce the amount of data to transmit, or for dynamic data routing; and it may allow for data to be tagged for both descriptive and routing purposes. In some cases, the hub also has the ability to dynamically adjust transmission data channels between the hub and the network, where different transmission channels have different properties predisposing them to different types of IoT data. In some cases, the combination of hub internal capabilities and/or the ability to dynamically hop between differently defined data backhaul communication channels enables specialized M2M communication network modes.

Disclosed herein, in some embodiments, are edge nodes of a network, otherwise known as hub devices advantageously enable highly efficient M2M network communication modes. By enabling specialization for M2M communications in hub devices herein, network capacity for useful M2M data can be increased by an order of magnitude. The hub elements and functions described herein can also advantageously augment IoT device capabilities thereby creating more markets for IoT devices and furthering their proliferation.

In one aspect, disclosed herein are hub devices for a machine-to-machine (M2M) communications network that enables multiple communication modes for one or more data source nodes, the hub comprising: at least one processor, a local connectivity system, a data processing and caching system comprising a local memory, and a data transmission system comprising a radio frequency communications element; the local connectivity system configured to collect data from the one or more data source nodes or send the data to the one or more data source nodes via an interface exposed to the nodes; the data processing and caching system configured to: receive and store user-defined data routing and processing functions; prioritize the collected data based on the user-defined data routing and processing functions; and route the prioritized data to the local memory for storage or to the data transmission system for immediate transmission based on the priority; the data transmission system configured to: dynamically assign an M2M upload mechanism to the routed data based on the user-defined data routing and processing functions and the priority, the mechanism selected from: a real-time transmission mechanism, a fixed interval mechanism, a data backhaul mechanism, and a user pull mechanism; and transmit the data, via the radio frequency communications element, to a network backhaul link for delivery to a host point based on the priority and the M2M upload mechanism. In some embodiments, the at least one processor runs a real-time operating system (RTOS). In some embodiments, the interface comprises a RESTful application programming interface (API). In some embodiments, the one or more data source nodes comprise one or more Internet-of-Things (IoT) data source nodes. In some embodiments, the interface comprises a wireless communications element. In some embodiments, the wireless communications element comprises one or more of: a Wi-Fi communications element, a Bluetooth communications element, a LoRa communications element, and a NarrowBand (NB)-IoT communications element. In some embodiments, the interface comprises a wired communications element. In some embodiments, the data processing and caching system is further configured to: receive network data from the host point; prioritize the network data based on the user-defined data routing and processing functions; and route the network data to the one or more data source nodes based on the priority. In some embodiments, the local memory comprises a local cache. In some embodiments, the local cache comprises a linear long-term cache, a linear short-term cache, and a circular cache. In some embodiments, the linear short-term cache is a subset of the linear long-term cache. In some embodiments, the one or more data source nodes comprise at least 10, at least 100, at least 1,000, at least, 10,000, or at least 100,000 nodes. In some embodiments, the routing the prioritized data to the local memory for storage further comprises aggregating the data to reduce packet overhead. In some embodiments, the aggregation of the data comprises: stripping redundant information from the header of each datum; and aggregating multiple datums from a node, over a predetermined interval, to create an aggregated data packet. In some embodiments, the prioritizing further comprises adding a tag to the aggregated data packet, the tag indicating priority. In some embodiments, the user-defined data routing and processing functions are configured and deployed to the hub device via a web-based management console. In some embodiments, the web-based management console comprises an IDE (integrated development environment) allowing a user to: browse a code library of data routing and processing functions; select one or more hub devices; write data routing and processing functions; compile the data routing and processing functions; and deploy the data routing and processing functions to the one or more selected hubs. In some embodiments, the user-defined data routing and processing functions are configured to perform one or more of the following: manipulate data; aggregate data; route data; and regulate interaction between the hub device and one or more of the data source nodes. In some embodiments, the one or more data source nodes call upon the user-defined functions through the interface exposed to the nodes by the hub. In some embodiments, the user-defined data routing and processing functions are applied to one or more of: a node, a type of node, a group of nodes, a type of data packet from a node, a type of data packet from a type of node, a type of data packet from a group of nodes, and a specific instance of a data packet from a node. In some embodiments, the user-defined data routing and processing functions include a data origin and a data endpoint. In some embodiments, the data origin comprises the one or more data source nodes. In some embodiments, the data endpoint comprises a cloud storage, a data visualization application, a data analysis application, or a data utilization application. In some embodiments, the hub device herein further comprising a session proxying system configured to proxy at least a portion of the data by a process comprising at least the following: communicate with the data processing and caching system and modify the user-defined data routing and processing functions of at least a portion of the data, such that: the data origin comprises the hub device and does not comprise the one or more data source nodes when one proxy session is included between the data origin and the data endpoint; and the data endpoint comprises a network operations server (NOS) and does not comprise the one or more data source nodes when two proxy sessions are included between the data origin and the data endpoint; and communicate with the data transmission system and enable data transmission of at least a portion of the data based on the modified user-defined data routing and processing functions. In some embodiments, the one or more data source nodes are unable to form a direct connection with the data endpoint for data transmission. In some embodiments, modification of the user-defined data routing and processing functions comprises reducing data size of at least a portion of the data. In some embodiments, the real-time transmission mechanism is implemented as a near real-time priority mode, an out-of-threshold or emergency transmission mode, or an always-on dedicated channel mode. In some embodiments, the fixed interval mechanism is implemented as a store and forward mode or a fixed interval mode. In some embodiments, the data backhaul mechanism is implemented as a fixed schedule mode. In some embodiments, the user pull mechanism is implemented as an on-demand reporting mode. In some embodiments, the network backhaul link is bandwidth constrained. In some embodiments, the network backhaul link comprises a cellular link. In some embodiments, the network backhaul link comprises a satellite link. In some embodiments, the satellite link comprises geostationary satellite link. In some embodiments, the data transmission system further comprises an electronically steered antenna. In some embodiments, the hub device herein further comprises a GPS module.

BRIEF DESCRIPTION OF THE DRAWINGS

A better understanding of the features and advantages of the present subject matter will be obtained by reference to the following detailed description that sets forth illustrative embodiments and the accompanying drawings of which.

DETAILED DESCRIPTION OF THE INVENTION

Figure 1:
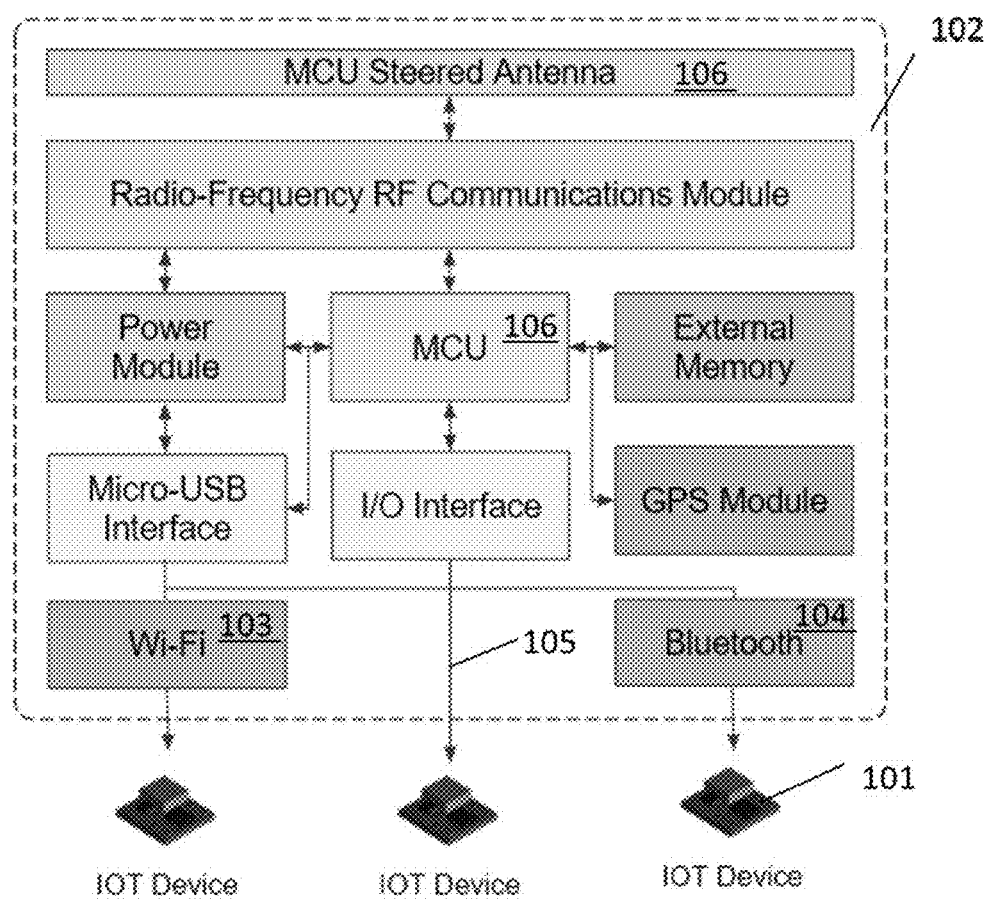
FIG. 1 shows a non-limiting schematic diagram of a hub device described herein.

Disclosed herein, in certain embodiments, are hub devices for a machine-to-machine (M2M) communications network that enables multiple communication modes for one or more data source nodes, the hub comprising: at least one processor, a local connectivity system, a data processing and caching system comprising a local memory, and a data transmission system comprising a radio frequency communications element; the local connectivity system configured to collect data from the one or more data source nodes or send the data to the one or more data source nodes via an interface exposed to the nodes; the data processing and caching system configured to: receive and store user-defined data routing and processing functions; prioritize the collected data based on the user-defined data routing and processing functions; and route the prioritized data to the local memory for storage or to the data transmission system for immediate transmission based on the priority; the data transmission system configured to: dynamically assign an M2M upload mechanism to the routed data based on the user-defined data routing and processing functions and the priority, the mechanism selected from: a real-time transmission mechanism, a fixed interval mechanism, a data backhaul mechanism, and a user pull mechanism; and transmit the data, via the radio frequency communications element, to a network backhaul link for delivery to a host point based on the priority and the M2M upload mechanism. In some embodiments, the at least one processor runs a real-time operating system (RTOS). In some embodiments, the interface comprises a RESTful application programming interface (API). In some embodiments, the one or more data source nodes comprise one or more Internet-of-Things (IoT) data source nodes. In some embodiments, the interface comprises a wireless communications element. In some embodiments, the wireless communications element comprises one or more of: a Wi-Fi communications element, a Bluetooth communications element, a LoRa communications element, and a NB-IoT communications element. In some embodiments, the interface comprises a wired communications element. In some embodiments, the data processing and caching system is further configured to: receive network data from the host point; prioritize the network data based on the user-defined data routing and processing functions; and route the network data to the one or more data source nodes based on the priority. In some embodiments, the local memory comprises a local cache. In some embodiments, the local cache comprises a linear long-term cache, a linear short-term cache, and a circular cache. In some embodiments, the linear short-term cache is a subset of the linear long-term cache. In some embodiments, the one or more data source nodes comprise at least 10, at least 100, at least 1,000, at least, 10,000, or at least 100,000 nodes. In some embodiments, the routing the prioritized data to the local memory for storage further comprises aggregating the data to reduce packet overhead. In some embodiments, the aggregation of the data comprises: stripping redundant information from the header of each datum; and aggregating multiple datums from a node, over a predetermined interval, to create an aggregated data packet. In some embodiments, the prioritizing further comprises adding a tag to the aggregated data packet, the tag indicating priority. In some embodiments, the user-defined data routing and processing functions are configured and deployed to the hub device via a web-based management console. In some embodiments, the web-based management console comprises an IDE (integrated development environment) allowing a user to: browse a code library of data routing and processing functions; select one or more hub devices; write data routing and processing functions; compile the data routing and processing functions; and deploy the data routing and processing functions to the one or more selected hubs. In some embodiments, the user-defined data routing and processing functions are configured to perform one or more of the following: manipulate data; aggregate data; route data; and regulate interaction between the hub device and one or more of the data source nodes. In some embodiments, the one or more data source nodes call upon the user-defined functions through the interface exposed to the nodes by the hub. In some embodiments, the user-defined data routing and processing functions are applied to one or more of: a node, a type of node, a group of nodes, a type of data packet from a node, a type of data packet from a type of node, a type of data packet from a group of nodes, and a specific instance of a data packet from a node. In some embodiments, the user-defined data routing and processing functions include a data origin and a data endpoint. In some embodiments, the data origin comprises the one or more data source nodes. In some embodiments, the data endpoint comprises a cloud storage, a data visualization application, a data analysis application, or a data utilization application. In some embodiments, the hub device herein further comprising a session proxying system configured to proxy at least a portion of the data by a process comprising at least the following: communicate with the data processing and caching system and modify the user-defined data routing and processing functions of at least a portion of the data, such that: the data origin comprises the hub device and does not comprise the one or more data source nodes when one proxy session is included between the data origin and the data end point; and the data endpoint comprises a network operations server (NOS) and does not comprise the one or more data source nodes when two proxy sessions are included between the data origin and the data endpoint; and communicate with the data transmission system and enable data transmission of at least a portion of the data based on the modified user-defined data routing and processing functions. In some embodiments, the one or more data source nodes are unable to form a direct connection with the data endpoint for data transmission. In some embodiments, modification of the user-defined data routing and processing functions comprises reducing data size of at least a portion of the data. In some embodiments, the real-time transmission mechanism is implemented as a near real-time priority mode, an out-of-threshold or emergency transmission mode, or an always-on dedicated channel mode. In some embodiments, the fixed interval mechanism is implemented as a store and forward mode or a fixed interval mode. In some embodiments, the data backhaul mechanism is implemented as a fixed schedule mode. In some embodiments, the user pull mechanism is implemented as an on-demand reporting mode. In some embodiments, the network backhaul link is bandwidth constrained. In some embodiments, the network backhaul link comprises a cellular link. In some embodiments, the network backhaul link comprises a satellite link. In some embodiments, the satellite link comprises geostationary satellite link. In some embodiments, the data transmission system further comprises an electronically steered antenna. In some embodiments, the hub device herein further comprises a GPS module.

Overview

IoT devices or data source nodes pose a unique set of operational requirements that need to be considered when designing an effective IoT network infrastructure. IoT devices may prioritize battery saving modes, sporadic communication schemes, and low power data processing capabilities, which generate different network usage patterns when compared with traditional network utilization from human users.

With the continued proliferation of smart devices and sensors, there is an urgent and unmet need for new network architectures that meet the ever growing bandwidth requirements of the internet of things. In some embodiments, the present disclosure includes devices and methods that enable specialized M2M network communication modes and capabilities via the edge node. In some embodiments, M2M communications have a spectrum of latency and performance requirements, for which networks can be optimized via communication modes and protocols. In some embodiments, increased network performance requires a synchronized optimization of the user edge nodes, the data backhaul network, and/or the network operations server (NOS). In some embodiments, the user edge node capabilities, or equivalently herein, the hub capabilities herein include functionality required to deliver specialized M2M communication modes while simultaneously augmenting IoT capabilities.

In some cases, a hub is an edge node that connects one or many devices to a host point, and/or the Internet, either directly or via a network base station. In some cases, the hub collects, tags, processes, and routes all incoming device data before relaying it to its desired endpoint. In some cases, devices route data through the hub like a generic network switch. In some embodiments, devices route data through the hub using a Representational State Transfer (REST) API on the hub to access more specialized functionality. The API may allow for data to be routed to local caches on the hub for temporary or indefinite storage; it may allow for incoming data to be processed by user-defined functions to reduce the amount of data to transmit, or for dynamic data routing; and it may allow for data to be tagged for both descriptive and routing purposes. In some cases, the hub also has the ability to dynamically adjust transmission data channels between the hub and the network, where different transmission channels have different properties predisposing them to different types of IoT data. In some cases, the combination of hub internal capabilities and/or the ability to dynamically hop between differently defined data backhaul communication channels enables specialized M2M communication network modes.

Disclosed herein, in some embodiments, are edge nodes of a network, otherwise known as hub devices advantageously enable highly efficient M2M network communication modes. By enabling specialization for M2M communications in hub devices herein, network capacity for useful M2M data can be increased by an order of magnitude. The hub elements and functions described herein can also advantageously augment IoT device capabilities thereby creating more markets for IoT devices and furthering their proliferation.

Disclosed herein are hub devices that may serve to facilitate connectivity for IoT devices and M2M communications by acting as both a transceiver, to or from network base stations, and as a data processing agent to address many of the unique connectivity issues IoT devices and M2M communications encounter. Disclosed herein are hub devices that can collect or receive data from one or more data source nodes such as IoT devices and aggregate data from one or many such devices via a ubiquitous wired or wireless local interface. The hub may relay any device data to its desired endpoint via a connection to a data backhaul base station including but not limited to a cell tower, satellite, or other network gateways. The hub may serve as the local agent to enable highly efficient and specialized M2M communication modes between data source nodes and their data endpoints, or any intermediate data stops such as the network operations server, while simultaneously exposing pertinent features to augment connected IoT device capabilities.

In some embodiments, a hub device herein includes a processing unit, a processor, or the like that is capable of executing instructions and running a real time operating system (RTOS). A hub device herein may further include a local memory cache, an interface for connecting with local devices, and a transceiver infrastructure capable of dynamically switching data channels for communication with a data backhaul network. A hub may collect data from connected devices, when required, processes that data, and then dynamically selects the appropriate channel to transmit the data over to a network base station. The combination of data processing and dynamic data backhaul network channel selection advantageously form the essential basis for enabling the efficient IoT device and M2M network communication modes and augmented IoT device capabilities.

Certain Terms

Unless otherwise defined, all technical terms used herein have the same meaning as commonly understood by one of ordinary skill in the art to which this invention belongs.

As used herein, the singular forms "a," "an," and "the" include plural references unless the context clearly dictates otherwise. Any reference to "or" herein is intended to encompass "and/or" unless otherwise stated.

As used herein, the term "about," "near," or "approximately" refers to an amount that is near the stated amount by about 10%, 5%, or 1%, including increments therein.

In some cases, a user disclosed herein is a person or an entity that utilizes the systems, networks, and/or services herein for data transmission. In some cases, a user is an enterprise or industrial organization, a business organization, a government agency, an educational institute, a health service organization, a religious organization, a scientific organization, a military organization, an agricultural organization, a charitable organization, or a profit or non-profit organization. In some cases, a user is a business owner, a researcher, a farmer, an engineer, a health professional, a scientist, or any individual that utilizes the systems, networks, and/or services herein. In various suitable embodiments, the user owns, installs, and/or set parameters/preference of devices herein. In some embodiments, the user collects, reviews, monitors, manages, or otherwise utilizes the data that's transmitted to the user's application or to designated storage places of the user.

In some embodiments, the user's application herein includes an application layer comprising the resulting information, insights, actions, and value that the users derive from their network of devices and data. In some embodiments, the user's application herein includes data analytics, data visualizations, data storages, data services, or data provision to third party consumers of data. Non-limiting examples of the user's application herein include: correlations between rain and soil moisture sensory data, visualization of speed of a wind turbine on a dashboard to monitor the wind turbine, recording digital payments from remote point-of-sale terminals, providing GPS data on an operator's truck to 3rd party insurance companies.

In some embodiments, the user's application disclosed herein includes a cloud-based storage. In some cases, the cloud storage includes servers on which data is stored or accessed over the Internet. In some embodiments, the servers are remotely located from the data source nodes, the user's application devices, hub, or NOS. In some cases, cloud storage can be owned by the user, or by a 3rd party service provider such as Amazon AWS or Microsoft Azure.

Data Source Nodes

In some embodiments, disclosed herein are data source nodes. In some embodiments, the data source node is formed by a device, a digital processing device, or a sensor disclosed herein. In some embodiments, the data source node is equivalent to a device and/or a sensor herein. In some embodiments, the data source node is in the IoT. In some embodiments, the data source node includes one or more of: an IoT sensor, IoT actuator, IoT controller, and IoT effector. In some embodiments, the data source node may comprise one or more of the following components including a sensing component, or equivalently, a sensor (e.g., thermocouple), a wired or wireless data connection with a communications element (e.g. a radio transceiver with an antenna or connection for an external antenna), a microcontroller (MCU), a microprocessor (MPU), an electronic circuit connected to the sensing component, and an energy source. In some embodiments, a data source node includes one or more sensors (e.g., a data source node is a wearable device having a sensor). In some embodiments, one or more sensors of a data source node are physically separate from a device of the data source node. In further embodiments, the one or more sensors of the data source node authorize the device to obtain sensor data. In further embodiments, the one or more sensors provide or send sensor data to the device autonomously. In further embodiments, the one or more sensors provide or send sensor data to the device based on the control at the device. In some embodiment, the device of the data source node provides a gateway.

In some embodiments, the communication element includes a receiver, a transmitter, and/or a transceiver. In some embodiments, the MCU or the MPU receives data from the sensing component or equivalent, the sensor, and transmit the data to the transmitter or transceiver to be transmitted to other remotely located elements within the network. In some embodiments, the receiver or transceiver receives data, for example, control data from remotely located devices, and such data gets relayed to the MCU or the MPU to generate commands to the sensing component. The sensing component performs one or more functions(s) based on the received command. In some embodiments, an electrical circuit utilized in data transfer among the sensing component, the MCU or MPU, and the communications element of the data source node.

In some embodiments, the IoT refers to the ever-growing network of physical devices, data source nodes, buildings, vehicles, sensors, and other objects for internet network connectivity for exchanging data. In many cases, IoT devices, data source nodes, or sensors are embedded with electronics, software, sensors, and network connectivity, etc. In some embodiments, IoT devices, data source nodes, or sensors feature an IP address for internet connectivity. In addition to an IP address, the IoT devices, data source nodes, or sensors may be associated with a MAC address or an SSID. It is understood that IoT devices, data source nodes, or sensors may connect with other devices through wired or wireless connections such as Ethernet, Bluetooth, Wi-Fi, LoRa, NB-IoT, or any other technology, including those described herein, which allow for transfer of data.

In some embodiments, a device disclosed herein is a device in the IoT. In some embodiments, a device disclosed herein includes hardware that generates data, receives data or instructions to perform an action, or initiates a transaction. In some embodiments, the hardware is configured to perform an action based on instructions or received data, such as an irrigation pump that can be actuated based on an instruction or received data or a point of sale device that receives instructions and initiates a payment transaction. In some embodiments, the devices herein have a built-in or attached wired or wireless communications element to provide a data connection, such as Ethernet, Bluetooth, Wi-Fi, LoRa, NB-IoT, or any other technology, including those described herein, which allow for transfer of data. In some embodiments, the device herein is configured to enable data communication via the communications element either in one direction or in both directions (i.e., transmission and receiving).

In various embodiments, the devices, sensors, or data source nodes herein includes one or more selected from: a homeland security device (e.g., a body scanner, metal detector, radiation detector, weapon, vehicle, perimeter intrusion detector, etc.), point-of-sale (PoS) system (e.g., a payment device, receipt printer, barcode or QR code scanner, etc.), smart city device (e.g., a parking meter, utility meter, lighting device, traffic monitoring camera, etc.), smart home device (e.g., a light, security system, appliance, thermostat, etc.), smart office device (e.g., a printer, coffee maker, etc.), smart manufacturing device (e.g., a robot, manufacturing actuator, assembly line sensor, etc.), health care device (e.g., a drug infusion pump, pacemaker, defibrillator, patient health monitoring device, etc.), freight or shipping asset (e.g., a shipping container, cargo, truck, rail car, watercraft, aircraft, etc.), transportation asset (e.g., a car, truck, watercraft, train, bus, aircraft, etc.), transportation telemetry device, environmental sensor (e.g., a carbon dioxide sensor, pollution detector, salinity meter, etc.), weather sensor (e.g., humidity sensor, temperature sensor, rain gauge, etc.), agriculture device (e.g., a farming machine, soil sensor, irrigation device, etc.), fishing vessel, utility device (e.g., a water meter, transformer, gas meter, etc.), pipeline monitoring device, power plant monitoring device, electrical grid monitoring device, and emergency calling device.

In some embodiments, the devices, sensors, or data source nodes herein include a sensing component, MCU, MPU, an electrical circuit, a software module, an application, and/or the like that monitors functionalities, controls functionalities, and/or tracks location and status of the devices, sensors, or data source nodes herein. In some embodiments, the sensing component, MCU, MPU, an electrical circuit, a software module, an application, and/or the like are embedded in the devices, sensors, or data source nodes. In some embodiments, data are generated based on the monitoring, controlling, and/or tracking of the devices, sensors, or data source nodes. For example, data are generated for the real-time location of a container based on a GPS sensor thereon. As another example, data are generated based on battery level of a pacemaker. In some embodiments, data are generated from the sensing component sensing factors external to the devices, sensors, or data source nodes. As an example, humidity data are generated from a humidity sensor.

In some cases, the hardware of the device herein includes a sensor. In some embodiments, a sensor herein is one of a GPS sensor, a Wi-Fi transceiver, a cellular transceiver, and a Bluetooth transceiver. In some embodiments, a sensor and/or sensor device comprises an acoustic sensor, a breathalyzer, a temperature sensor, a carbon dioxide sensor, a carbon monoxide sensor, an infrared sensor, an oxygen sensor, an ozone monitor, a pH sensor, a smoke detector, a current sensor (e.g., detects electric current in a wire), a magnetometer, a metal detector, a radio direction finder, a voltage detector, an air flow meter, an anemometer, a flow sensor, a gas meter, a water meter, a Geiger counter, an altimeter, an air speed indicator, a depth gauge, a gyroscope, a compass, an odometer, a shock detector (e.g., on a football helmet to measure impact), a barometer, a pressure gauge, a thermometer, a proximity sensor, a motion detector (e.g., in a home security system), an occupancy sensor, an inertial sensor, a gyroscope, or any combination thereof, and in some embodiments, sensor data comprises information obtained from any of the preceding sensors. Other examples of sensors may include but are not limited to location sensors, vision sensors (e.g., imaging devices capable of detecting visible, infrared, or ultraviolet light, such as cameras), proximity sensors (e.g., ultrasonic sensors, LIDAR, time-of-flight cameras), inertial sensors (e.g., accelerometers, gyroscopes, inertial measurement units (IMUs)), audio sensors (e.g., microphones) or field sensors (e.g., magnetometers, electromagnetic sensors). Any suitable number and combination of sensors can be used, such as one, two, three, four, five, or more sensors. Optionally, the data can be received from sensors of different types (e.g., two, three, four, five, or more types). Sensors of different types may measure different types of signals or information (e.g., position, orientation, velocity, acceleration, proximity, pressure, etc.) and/or utilize different types of measurement techniques to obtain data. For instance, the sensors may include any suitable combination of active sensors (e.g., sensors that generate and measure energy from their own source) and passive sensors (e.g., sensors that detect available energy).

In some embodiments, the devices, sensors, or data source node herein is in a network. In some embodiments, the data source node, devices, sensors herein is in a data packet-switched network, IoT network, or any other type of networks that allows data packet switches among nodes therewithin. Non-limiting examples of the network herein include IoT networks, wireless sensor networks (WSN), and wireless sensor and actuator networks (WSAN). In some embodiments, the network is a Wi-Fi, WiMAX, or LTE MESH network. The network may include a central node for controlling the network. In some embodiments, the network has a distributed architecture to reduce the impact of a failed node.

In some embodiments, the type of the node may be based on the type of the sensor, the type of the device, the type of the data packets collected from the node, a geolocation of the node, a function of the node, a user's setting, or any other property or parameters of the node.

In some embodiments, the plurality of data source nodes disclosed herein comprises at least 1,000, at least 10,000, at least 100,000, at least 1,000,000, at least 1,000,000,000, or at least 1,000,000,000,000 machine-operated data source nodes. In some embodiments, the plurality of data source nodes disclosed herein comprises at least 1,000, at least 10,000, at least 100,000, or at least 1,000,000, at least 1,000,000,000, or at least 1,000,000,000,000 human-operated data source nodes. In some embodiments, the systems and networks disclosed herein include from about 100 to about 100 trillion data source nodes. In some embodiments, the systems and networks disclosed herein include from about 100,000 to about 100 billion data source nodes. In some embodiments, the systems and networks disclosed herein include at least 100,000, at least 200,000, at least 300,000, at least 400,000, at least 500,000, at least 600,000, at least 700,000, at least 800,000, at least 900,000, at least 1,000,000, at least 2,000,000, at least 3,000,000, at least 4,000,000, at least 5,000,000, at least 6,000,000, at least 7,000,000, at least 8,000,000, at least 9,000,000, at least 1 million, at least 10 million, at least 20 million, at least 30 million, at least 40 million, at least 50 million, at least 60 million, at least 70 million, at least 80 million, at least 90 million, at least 100 million, at least 200 million, at least 300 million, at least 400 million, at least 500 million, at least 600 million, at least 700 million, at least 800 million, at least 900 million, at least 1 billion, at least 10 billion, at least 20 billion, at least 30 billion, at least 40 billion, at least 50 billion, at least 60 billion, at least 70 billion, at least 80 billion, at least 90 billion, at least 100 billion, at least 200 billion, at least 300 billion, at least 400 billion, at least 500 billion, at least 600 billion, at least 700 billion, at least 800 billion, at least 900 billion, at least 1 trillion, at least 10 trillion, at least 20 trillion, at least 30 trillion, at least 40 trillion, at least 50 trillion, at least 60 trillion, at least 70 trillion, at least 80 trillion, at least 90 trillion, at least 100 trillion or more, data source nodes, including increments therein.

Management Consoles

In some embodiments, the hub devices and networks disclosed herein include a management console. In some embodiments, the management console includes one or more processors, a persistent data store, a memory, a user interface, one or more software modules, a web application, a mobile application, a user interface, a computer-readable medium, a wired or wireless connection, a communications element, a database, and a power source. In some embodiments, the communications element includes a transmitter, a receiver, and/or a transceiver. In some cases, the management console includes a digital processing device, a processor, or the like. In some embodiments, the management console is connected to the Internet. In some embodiments, the management console is connected to the networks and systems disclosed herein, thus, the elements therewithin.

In some embodiments, the management console is accessible by the user using a digital processing device remotely from the hub. In some embodiments, the management console is accessible by the user using a digital processing device connected the hub via a wired or wireless connection.

In various embodiments, the management console is accessible from any suitable computing device connected to any network providing access to the Internet.

In some embodiments, the management console comprises an IDE (integrated development environment) 600 which allows a user to browse a code library 601 of data routing and processing functions; select one or more hub devices 605; add, modify, or delete data routing and processing functions using the code library using a coding interface 602; compile the data routing and processing functions 603; and deploy the data routing and processing functions 604 to the one or more selected hubs. In some embodiments, the user-defined data routing and processing functions are configured to perform one or more of the following: manipulate data; tag data; aggregate data; route data; and regulate interaction between the hub device and one or more of the data source nodes. In some embodiments, manipulation of the data includes any data processing procedures that results some changes in the data after the processing procedure. Nonlimiting examples of data manipulation includes: a mathematical operation of data, a mathematical transformation of data, a logic operation of data, and other data processing operations such as data compression, data encryption, data sampling, data filtration. For example, as in shown in 602 of FIG. 6, raw data may be processed using mathematical operations in order to generate temperature data. In some embodiments, the user may define the details for data aggregation and such details may determine what data to be aggregated. For example, data aggregation may be customized to data from a data source node, a type of data source node, a type of data packet, a data packet, a group of data source node, and/or a group of data packet. In some embodiments, the user may define how to aggregate data. For example, the user can determine what information is redundant and can be removed during aggregation. As an example, the user can define the maximal or minimal datum size after aggregation. As yet another example, the user can alternatively determine to aggregate every 10 data packets into a single aggregated packet. As yet another example, the user may select to aggregate data packets during a specific time period, either for a single time or recurrently.

Figure 6:
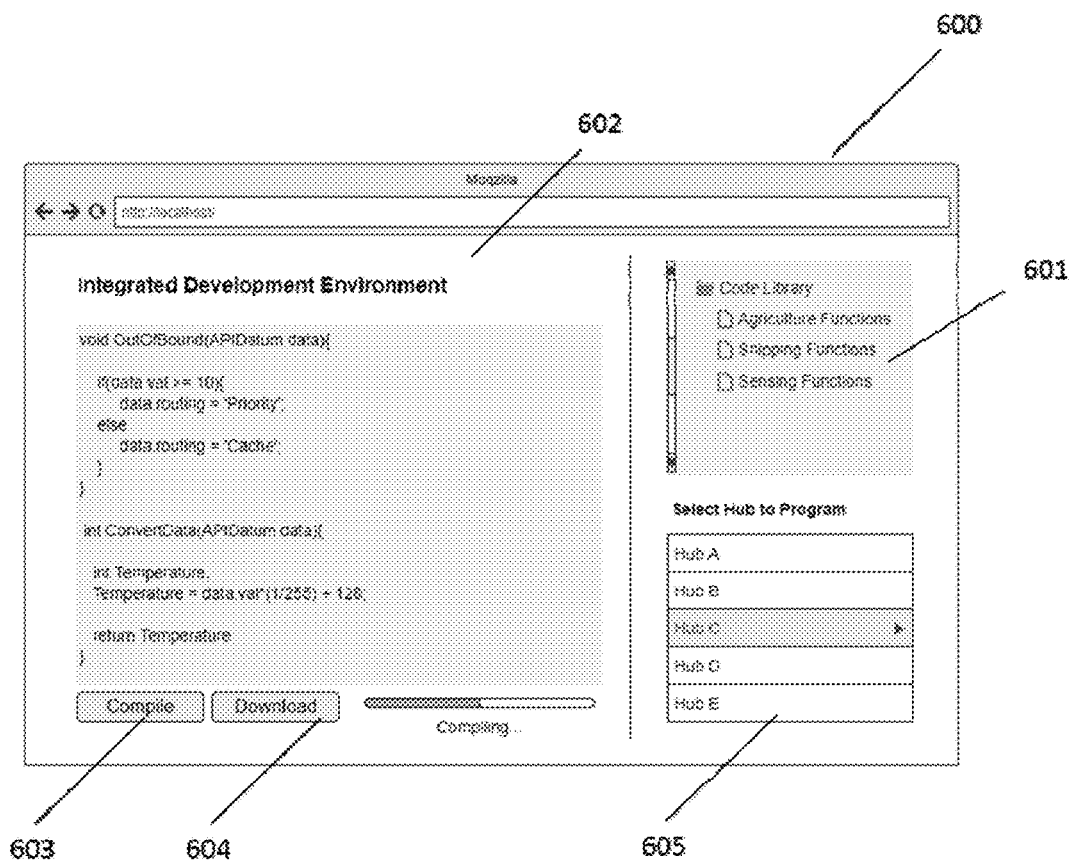
FIG. 6 shows a non-limiting exemplary embodiments of a web-based integrated development environment (IDE) for developing the user defined functions and downloading the functions to the hub devices herein.

Referring to FIG. 6, in a particular embodiment, a user interface 600 is provided by the systems and methods herein to allow users to generate customized user-defined functions. In this embodiment, the user interface includes a web-based integrated development environment (IDE) 602. Using this IDE, a user can select one or more functions for data processing from various pre-existing functions from a code library 601, the pre-existing functions optionally organized in different categories, such as sensing functions, shipping functions, and agriculture functions. The user can compile one or more of the selected functions directly 603, or edit one or more of the functions for customization using the IDE coding interface 602 before compilation. Then the user developed data processing functions can be downloaded 604 to selected hub(s) 605. Such user defined functions can be used to manipulate or process data; aggregate data; route data; and interact with data source nodes. In this particular embodiment, the user may define data routing functions so that when data value is above 10, the data is prioritized for immediate transmission, otherwise the data is send to local caches of the hub. In the same embodiment, the user may define data processing function so that the raw data collected by the user device(s) is converted to valid temperature(s). In this particular embodiment, data source nodes can call upon the user defined functions through the interface exposed to the nodes by the hub.

In some embodiments, the user may define specific routing information or data tag for data from a data source node, a type of data source node, a type of data packet, a data packet, a group of data source node, and/or a group of data packet. For data routing and tagging, in some cases, user may defined parameters include a routing ID, data processing command, data priority tag, and transmission preference. In some cases, routing IDs can be used to route data over the backhaul network and can be compared against a database, optionally at the network operations center for destination routing, whether it is a cloud storage destination or a user-defined application. In some cases, data tags or flags (e.g., binary digit(s), or text) can be customized by users to be added to their data before it is routed to a local cache of the hub. Exemplary data tags include a custom tag for all devices located in a user-defined geographic area, or a custom tag for all devices that match user-defined criteria, such as water level above a threshold.

In some embodiments, the information of data routing, tagging, and configuration parameters are may be appended to the data play load in the data packet but optionally separated from the original data header and data payload, or datum.

In some embodiments, the one or more data source nodes call upon the user-defined functions through the interface exposed to the nodes by the hub. In some embodiments, the user-defined data routing and processing functions are applied to one or more of: a node, a type of node, a group of nodes, a type of data packet from a node, a type of data packet from a type of node, a type of data packet from a group of nodes, and a specific instance of a data packet from a node.

In some embodiments, the management console allows the user to perform one or more of: creating a user account, logging into a user account, creating or edit a user profile, registering one or more devices (e.g., data source nodes, hubs, and/or NOSs), selecting one or more devices (e.g., data source nodes, hubs, and/or NOSs), and managing one or more devices (e.g., data source nodes, hubs, and/or NOSs). In some embodiments, the management console provides information pertaining to the one or more data source nodes, hubs, and/or NOSs selected by the user. In some embodiments, the management console allows the user to edit parameters of the one or more data source nodes, hubs, and/or NOSs.

In some embodiments, the management console herein further allows a user to configure one or more communication modes. For instances, the user may define, review, edit, save, copy, monitor, or manage one or more modes. In some cases, the modes can be assigned for one or more data source nodes, one or more types of data source nodes, one or more data packets, and/or one or more types of data packets from one or more data source nodes. In some cases, the modes are assigned for one or more human-operated or machine-operated nodes, one or more data packets from the human-operated or machine operated nodes. In some embodiments, the node(s) or data packets may be of one or more types. By way of example, a farmer has a temperature sensor in his farm and a video camera installed in his baby's room. He selects two different communication modes, one for his temperature sensor and the other for the video camera. More specifically, he selects a near real-time mode for live streaming from his video camera to his mobile device during 6 pm-7 am and daily read of his temperature sensor to his desktop only during winter when cold temperature may cause damage to his crops.

In some embodiments, the management console or IDE disclosed herein includes at least one computer program, or use of the same. Such computer program includes a sequence of instructions, executable in the hub device's processor(s), written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions herein may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

In some embodiments, the management console or IDE disclosed herein includes a web application. In light of the disclosure provided herein, those of skill in the art will recognize that a web application, in various embodiments, utilizes one or more software frameworks and one or more database systems. In some embodiments, a web application is created upon a software framework such as Microsoft®.NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® Actionscript, Javascript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft Silverlight®, Java™, and Unity®.

In some embodiments, the management console or IDE disclosed herein includes a mobile application provided to a mobile device. In some embodiments, the mobile application is provided to a mobile device at the time it is manufactured. In other embodiments, the mobile application is provided to a mobile device via the computer network described herein. Nonlimiting examples of the mobile devices includes smartphones and tablets.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, Javascript, Pascal, Object Pascal, Python™, Ruby, VB.NET, WML, and XHTML/HTML with or without CSS, or combinations thereof.

Session Proxying Systems

In some embodiments, the hub devices herein include a session proxying system.

In some embodiments, the user-defined data routing and processing functions include a data origin and a data endpoint. In some embodiments, the data endpoint is equivalent to the data destination herein. The data origin may comprise the one or more data source nodes. The data endpoint may comprise a cloud storage, a data visualization application, a data analysis application, or a data utilization application. In some embodiments, the data origin and data endpoint may be changed by the data processing and caching system, for example, if any proxying sessions are used.

In some embodiments, the session proxying system is configured to proxy at least a portion of the collected data. In some embodiments, session proxying system communicates with the data processing and caching system and modifies the user-defined data routing and processing functions of at least a portion of the data. When one proxy session is included between the data origin and the data endpoint, the data origin may be changed by the session proxying system to comprise the hub device and does not comprise the one or more data source nodes. When two proxy sessions are included between the data origin and the data endpoint, the data endpoint comprises a network operations server (NOS) and does not comprise the one or more original data endpoints. After modifying the original data origins and/or data end points provided by the user-defined functions or the data source nodes, the session proxying system may communicate with the data transmission system and enable data transmission of at least a portion of the data based on the modified user-defined data routing and processing functions.

The session proxying system may be used when the one or more data source nodes are unable to form a direct connection with their desired data endpoint for data transmission. In some embodiments, modification of the user-defined data routing and processing functions by the session proxying system comprises reducing data size of at least a portion of the collected data.

For device transmissions that are routed through the API, the session may be proxied by the hub. The hub can proxy a single session directly with the data's desired endpoint, or a two proxy approach can be used where the hub proxies a session with the NOS and the NOS proxies a session with the data's desired endpoint. In some cases, the proxying scheme enables efficient use of the data backhaul network capacity. In some cases, a significant network efficiency issue for most M2M communications is that typically M2M data packets have an extremely large header to useful data packet ratio, resulting is the majority of data backhaul network capacity being used by header information rather than the actual useful data itself. Proxying sessions at the hub may advantageously allow for data to be aggregated producing better header to data packet ratios. A two proxy system, where an additional proxy is used from the network operation center to the data's desired endpoint can allow for custom ultra-lightweight encapsulation schemes. In addition to enabling increased data backhaul network efficiency, proxying sessions from the hub may allow IoT devices, which typically are extremely computationally restricted to leverage the computational resources of the hub to open secure and other computationally expensive sessions.

Figure 8:
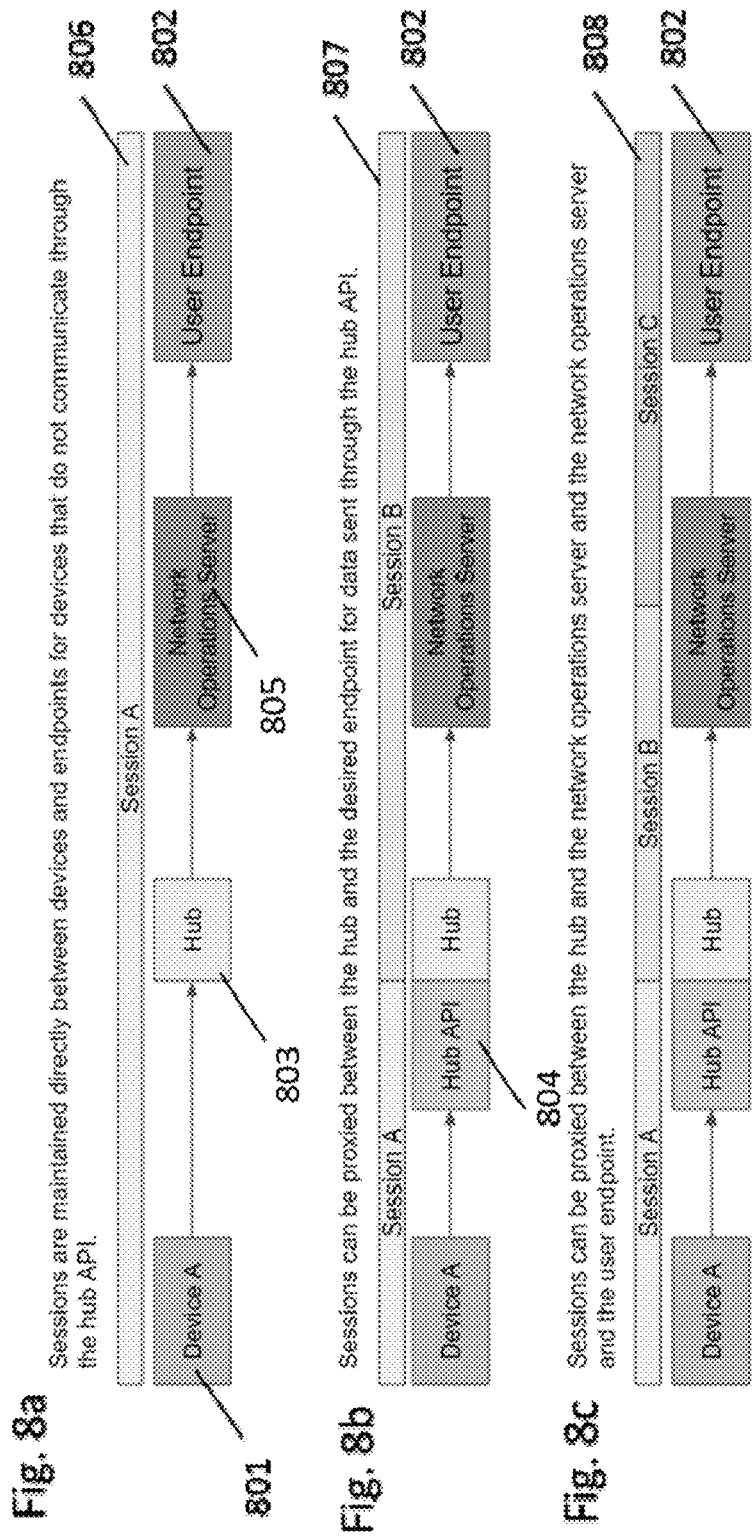
FIGS. 8A-8C show a non-limiting schematic diagram of the hub devices disclosed herein; in this case, different proxying sessions between data sources nodes and data endpoints.

Referring to FIGS. 8a-8c, in a particular embodiment, the hub supports one or more data session modes between connected devices 801 and their desired data endpoints 802. In this embodiment, data that is not sent through the hub API, no proxying of the connection occurs, and a direct data session 806 exists between the local connected device 801 and its desired endpoint 802. Data that enters the hub 803 through the API 804 can be proxied in two manners. In one scenario as in FIG. 8b, the hub 804 proxies a connection directly to the desired endpoint, while in the other scenario as in FIG. 8c, the connection is proxied at both the hub and the network operations center 803. These two different proxy types are useful for devices which do not have the capabilities to open direct sessions with their desired endpoints, and/or for users who wish to minimize the amount of information sent over the network.

Hub Devices

In some embodiments, a hub, or equivalently, a gateway, disclosed herein includes a local aggregator of device data which serves to forward data from devices to a Network Operations Server (NOS). In some embodiments, data forwarding from the hub to the NOS is over a data backhaul link. In some embodiments, the hub herein also serves to transmit data from the NOS back to the devices.

In some cases, the hub enables the following for user's devices: providing a wireless/wired interface for communicating data; aggregating and locally caching data from devices; receiving and following commands from NOS on when and/or how to transmit data over a network channel disclosed herein; transmitting cached data over a data backhaul medium.

In some embodiments, a hub, or equivalent, a gateway hub is a device where data sent through the hub is dynamically routed through different network transmission mechanisms via configuration options exposed to the user. In some embodiments, such configuration options are accessible by the user from a hub served API and/or an online hub configuration portal.

In some embodiments, the hub acts as a network gateway between data source nodes (e.g., devices, sensors) and a NOS or a data backhaul base station.

In some embodiments, the hub herein can accept connection from data source nodes and/or make connection to data source nodes. In some embodiments, the hub keeps track of all connected devices. In some embodiments, the hub has the capability to accept or reject devices based on user-defined settings.

In some embodiments, a hub herein is associated with a single, specific user and provides the capability for that user to "claim" therefor control various functionalities of the hub. In some embodiments, a hub is associated with multiple users. One or more among the multiple user may claim the hub therefor control various functionalities of the hub.

In some embodiments, a hub herein runs a local webserver which hosts a RESTful API for connected devices to interface with and transmit their data over.

In some embodiments, the hub herein allow users to define data routing procedures on a per packet basis for data pushed through the RESTful API using API configuration flags.

In some embodiments, the hub herein contains a local data cache to store data pushed by devices through the hub for extended periods of time.

In some embodiments, data stored in the cache of the hub can be prioritized, so valuable data can be sent to the front of the cache to fit into the next transmission time slot.

In some embodiments, a hub supports at least several upload transmission mechanisms from data source nodes including: (1) real time data upload; (2) fixed interval (e.g. every 15 minutes upload data); (3) data backhaul (once local cache of the hub is full, or once every 24 hours schedule a time to upload entire cache to the NOS or data endpoint, or user scheduled upload time), and (4) user pull. In some embodiments, these upload transmission mechanisms provided by the hub in combination with hub utilities provides the different network communication modes herein. For example, On-Demand Reporting mode is defined by the fact that data is aggregated in the hub, then when requested is sent via a real time data upload mechanism.)

In some embodiments, a hub herein dynamically changes network transmission data channels as prescribed by the user, the NOS, or both.

In some embodiments, a hub herein allows data sent through the hub to be stored indefinitely until requested by the user.

In some embodiments, a hub herein runs an API which allows for data pushed over the API to be tagged and classified.

In some embodiments, a hub herein aggregates data stored in its local cache and optimizes packet overhead.

In some embodiments, hub herein coordinate data sent over an API with a central server to provide additional transmission configuration parameters.

In some embodiments, a hub can proxy data communication sessions for data sent through the hub API.

In some embodiments, a hub herein allows users to deploy functions which can be called by the hub API to process posted data. In some embodiments, a hub allows deployed functions to determine data routing. (e.g., in Out of Threshold mode, if data<X, data can be routed to (Fixed Interval Transmission (FIT) cache, else if data>=X, data can be routed to Real Time Data channel for transmission).

In some embodiments, the hub devices herein are part of one or more IoTs. In some embodiments, the hub includes one or more of a digital processing device, a processor, a memory, a buffer, a cache, a software module, a computer-readable medium, a wired or wireless connection, a web application, a mobile application, a management console, a communications element, a database, and a power source. In some embodiments, the communications element includes a transmitter, a receiver, and/or a transceiver. In some cases, the hub includes a digital processing device, a processor, or the like. In some embodiments, the processor runs a real-time operating system (RTOS). In some embodiments, the hub is connected to the Internet. In some embodiments, the hub is connected to the networks disclosed herein, thus, the elements therewithin.

Referring to FIG. 1, in a particular embodiment, the hub 102 acts as the gateway between a local network of connected data source nodes 101 (e.g., devices) and the Internet. It collects data from connected devices and transmits it to a network base station where it is further relayed to its destination. In this embodiment, the hub includes one or more subsystems to enable local connectivity, data processing and caching, and transmission to a network base station. Devices connect to the hub through ubiquitous Wi-Fi 103 and Bluetooth 104 interfaces, and also have the capacity to utilize a physical link 105 to the hub. The hub also contains an MCU 106 and local memory bank to provide data routing, processing, and storing requirements to enable key networking technologies. An electronically steered antenna 107 is used to transmit data from the hub to a base station.

Local Connectivity Systems

In some embodiments, the hub devices herein includes a local connectivity system that is configured to actively collect data or passively receive data from data source nodes or send data to data source nodes via an interface of the hub exposed to the nodes.

In some embodiments, the interface comprises a RESTful application programming interface (API). In some embodiments, the interface herein comprises a wireless or wired communications element.

In some embodiments, the hub devices herein include a wired or wireless connection that enable data communications among connected elements of a network, optionally via a communications element 106, 107 as shown in FIG. 1. In some embodiments, the connection herein is equivalent to a data link. In some embodiments, the data link or connection includes one or more network channels. For example, the wired or wireless connection 506 in FIG. 6 enables data communication from data source node(s) to hub devices. As another example, the connection is configured to allow data communication between the hub and one or more of: a network operation server, a base station, a cloud storage, and a user's application.

In some embodiments, the wireless communications element comprises one or more of: a Wi-Fi communications element, a Bluetooth communications element, a LoRa communications element, and a NB-IoT communications element. Other non-limiting examples of the data connection or communication mode includes: Ethernet, Bluetooth LE, ZigBee, Near field communication (NFC), worldwide interope, Worldwide Interoperability for Microwave Access (WiMAX), long-term evolution (LTE), cellular network signal, wireless local area networks (WLANs), wireless USB, ultra-wide-band, ultraband, a microwave based connection, an infrared based connection, ultrasound-wave based connection, electromagnetic induction-based connection, or a sound-wave based connection. In some embodiments, the communications element includes a network cable. Non-limiting example of such cables include: twisted pair, phone-line, DSL, power line, USB, auxiliary, and fiber optic cables.

In some embodiments, the hubs or networks herein include a wired or wireless data link that enables data communications among connected elements. In some embodiments, the data link is a satellite or terrestrial wireless link. In some embodiments, the data link is a data backhaul link. The backhaul link can be a fixed wireless link (e.g., fixed point-to-point terrestrial wireless link) or a mobile wireless link (e.g., mobile satellite service).

Data Processing and Caching Systems

In some embodiments, the hub herein includes a data processing and caching system. In some embodiments, for data collected from the data source nodes, the data processing and caching system herein is configured to receive user-defined data routing and processing functions from a web-based management console disclosed herein. In some embodiments, the user-defined data routing and processing functions are configured via the web-based management console herein and deployed to the hub.

In some embodiments, the data processing and caching system prioritizes the collected data based on the user-defined data routing and processing functions. In some embodiments, prioritizing comprises adding a tag to the data packet, either aggregated or non-aggregated data packet. In some embodiments, different type of tags indicates different priorities of data. In some embodiments, different tags may indicate different information of data. For examples, tags may be used to indicate user-defined spatial and temporal ranges of the data being collected. In some embodiments, the data processing and caching system routes the prioritized or otherwise tagged data to the local memory for storage or to the data transmission system for immediate transmission based on the priority.

Figure 5:
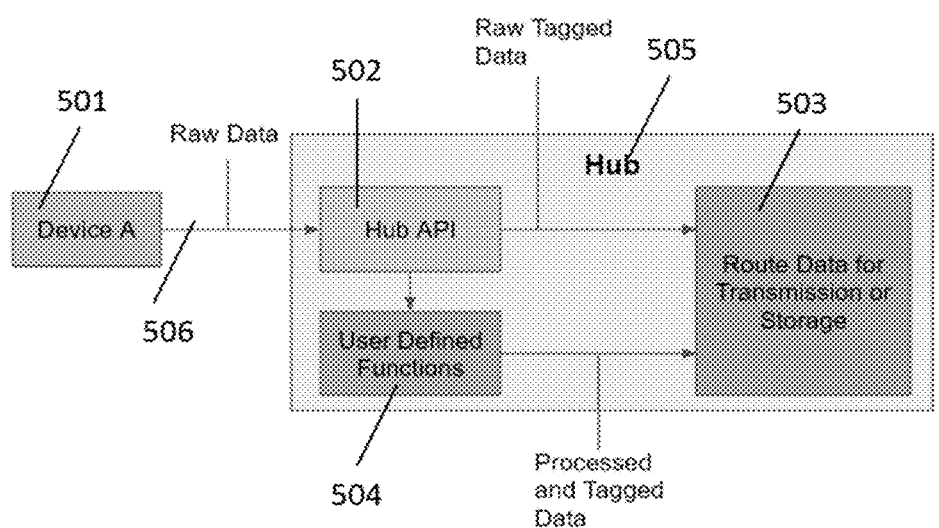
FIG. 5 shows a non-limiting schematic diagram of the hub devices disclosed herein; in this case, a hub device comprising an API that allows a user to customize the processing and routing of data to or from devices.

Referring to FIG. 5, in a particular embodiment, users can define and deploy functions 504 to the hub 505 and such functions are called for execution by the API 502. In this embodiment, the user can define and deploy functions using a management console herein. In this embodiment, devices 501 sending data through the hub API can call these functions to process incoming data so that the data are processed by user defined function(s), optionally to reduce the amount of data to transmit, and tagged, optionally for descriptive and/or routing purposes. In this embodiment, the tagged data and the tagged and processed data are routed for transmission 503. In this embodiment, the data processing by user-defined functions allows the computational requirements to draw conclusions from raw data to be outsourced to the hub, which reduces the requirements of any connected devices, eases reconfiguration, and reduces the bandwidth required to transmit any raw data over a network. For example, a user can deploy an out of threshold value function, where if a datum value is below a threshold it is sent to the hub cache for later transmission, but if the datum is over a threshold value it is routed for immediate transmission, thus, the total amount of data to transmit is reduced.

In some cases, at least part of the data stored in caches is subject to a data prioritization scheme. In some cases, all data stored in caches is subject to a data prioritization scheme. The latency performance of transmitting data may be dependent upon that data's position in its cache. Data near the front of the cache can be transmitted before data at the back of the cache. To enable data mobility within the cache data sent through the API can be tagged for either high, standard, or low priority. High priority data may be routed to the front of the cache, ahead of any standard or low priority data already in the cache ensuring the maximum possible latency performance for non-real time data transfers. Similarly, standard priority data may be stored in the cache ahead of any low priority data.

Figure 3:
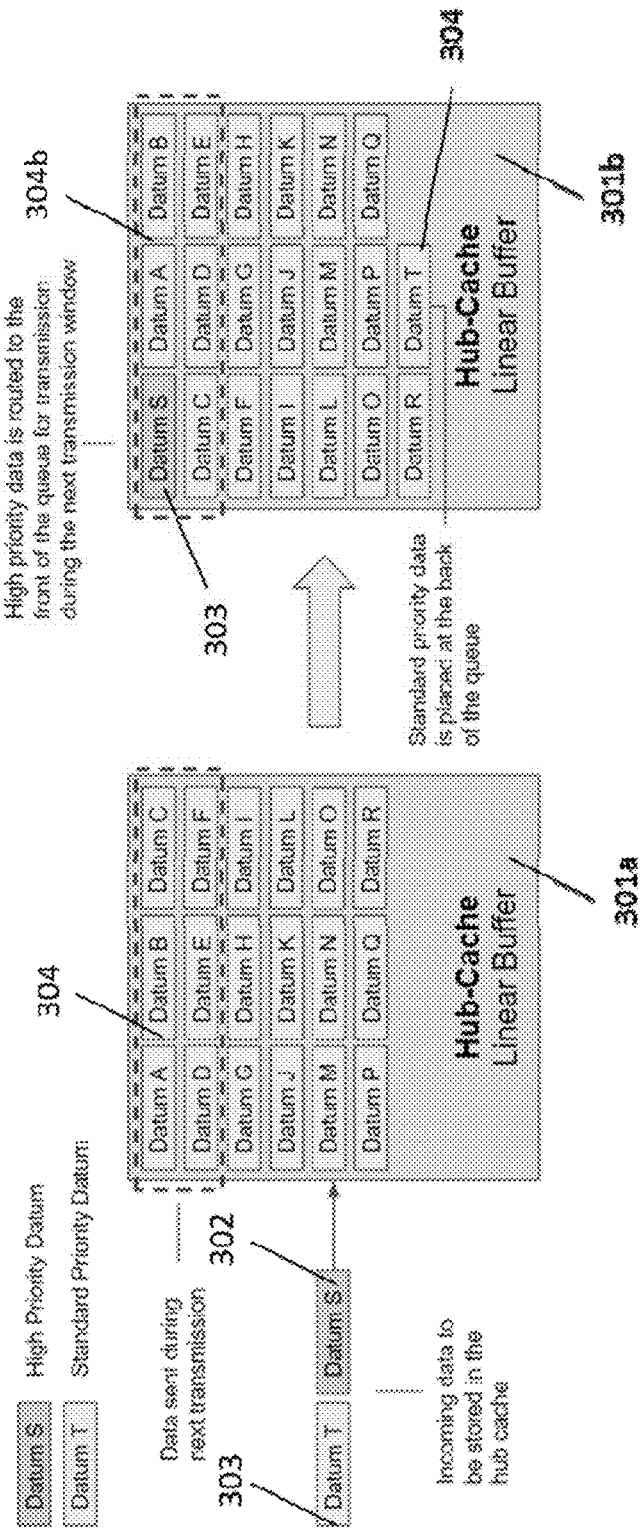
FIG. 3 shows a non-limiting schematic diagram of data storage based on data priority in hub memory with local caches.

Referring to FIG. 3, in a particular embodiment, the hub cache 301a, 301b supports a data prioritization scheme to enable data mobility within the cache. In this embodiment, data sent through the hub's API can be tagged as either high priority data 302, standard priority data 303, or low priority data. In this embodiment, priority tag is added according the user's selection of priority level. High priority data is placed in the front of the hub cache 301b allowing it to be sent over the soonest transmission window 304, while standard or low priority data is placed at the back of the hub cache and is only sent during a transmission window if no other high or standard priority data needs to be sent.

In some embodiments, the hub receives data packets from data source nodes with a standard format. In this standard format, the data packet include one or more headers (e.g., an IP packet header consisting of a source IP, destination IP, ID, QoS flag and other information, one or more device ID and telemetry (e.g., a unique device identifier, and device metadata such as device location, battery status, or device health status. In some embodiments, the header is of a fixed length/size. In some embodiments, the device ID and telemetry is of a fixed length/size. The data packet may also include datum or payload which is the actual data that needs to be transmitted from the devices. The data payload may be fixed or variable length, depending on the type of data source node. In some embodiments, the header and the device ID and telemetry comprise data packet 'overhead' which is data other than the payload, which may be required to transport the payload to its final destination.

In some embodiments, routing the prioritized data to the local memory for storage includes aggregating the data to reduce packet overhead. The aggregation of the data may comprise stripping redundant information from the header of each datum; and aggregating multiple datums from a data source node with a single header or a fewer number of headers, over a predetermined interval, to create an aggregated data packet.

Figure 4:
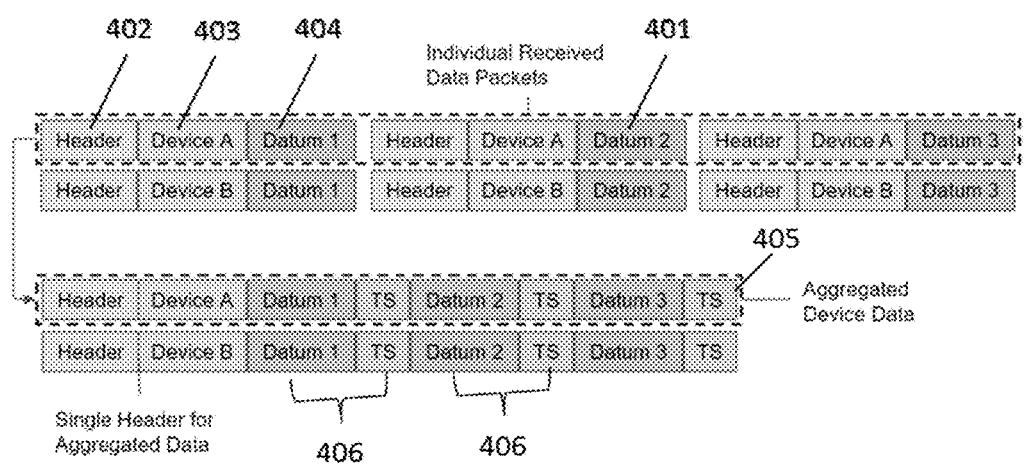
FIG. 4 shows a non-limiting schematic diagram of aggregation of individual data packets using a hub device described herein.

Referring to FIG. 4, in a particular embodiment, a data packet 401 includes 3 over heads and 3 pieces of data pay loads, with each data payload 404 appended to the specific overhead 402, 403. In this embodiment, the data packet overhead can be larger than the actual data packet itself, significantly reducing the amount of useful data that can be sent over a limited bandwidth communication system and the backhaul link is therefore ill-utilized if data packets are transmitted over the backhaul network in their native format. Thus, in this embodiment, individual data packets are transformed into aggregated data packets 405 which eliminates the repetitive information in the data overhead and results in a significant reduction in the ratio of packet overhead to packet data In this embodiment, the hub transforms these device data packets into aggregated data packets using one or more of the following steps: stripping redundant information from the header (such as IP addresses); aggregating multiple datums or payloads from data source nodes, over a predetermined interval (for example, multiple data payloads from a same data source nodes are aggregated together), and creates an aggregated data packet comprising: device ID, telemetry, and multiple pairs of datum+timestamp 406 ("TS") of each original device data packet. This aggregated data packet is then sent over the network backhaul to the NOS.

In the opposite direction, such data aggregation at the hub may be reversed. In some embodiments, the NOS sends aggregated data or commands from data endpoints such as user applications to the hub, the hub then disassembles the packets into individual packets bound for different devices that are connected to the hub.

In some embodiments, for data to be transmitted to the data source nodes, the data processing and caching system is configured to receive network data from the host point (e.g., the Internet, user applications, cloud storage); prioritize the network data based on the user-defined data routing and processing functions; and route the network data to the one or more data source nodes based on the priority.

In some embodiments, the local memory of the hub comprises a local cache, buffer, or use of the same. In some embodiments, the local memory is one or more physical apparatuses used to store data or programs on a temporary or permanent basis. In some embodiments, the local memory is volatile memory and requires power to maintain stored information. In some embodiments, the memory is non-volatile memory and retains stored information when the hub device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

The local memory may be divided into one or more local caches. In some embodiments, the local cache(s) include a linear long-term cache, a linear short-term cache, and a circular cache. The linear short-term cache may be a subset of the linear long-term cache. The linear long-term cache may include a DBH-Cache. The linear short-term cache may include a FIT-Cache. The circular cache may include a PULL-Cache. In some cases, all data sent through the hub API for transmission over data backhaul or fixed interval services is stored in local memory on the hub until a transmission window becomes available.

In some embodiments, the memory on the hub further includes the PULL-cache which is a circular data buffer for indefinite storage until a user requests it to be transmitted. In some embodiments, the PULL-cache is a circular data buffer that retains the latest data sent to the cache. In some embodiments, users can request the data in the PULL-cache and have it sent over the real-time data channel. In some embodiments, the user pull transmission mechanism allows users an option to only receive data when they request it. Data transmitted over the API is stored in a priority sorted fashion in the PULL-cache until transmission occurs.

Figure 2:
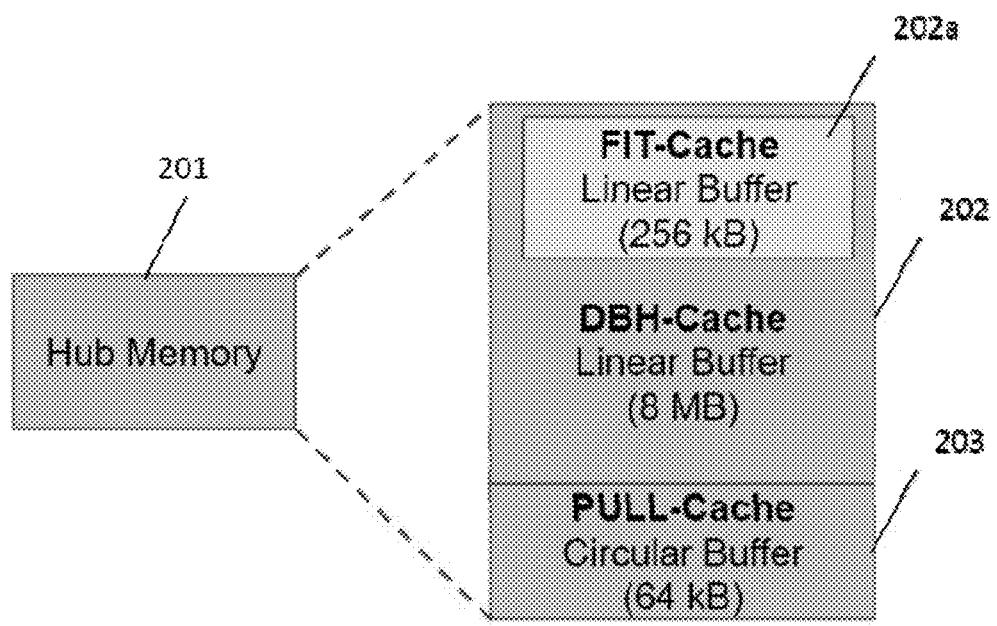
FIG. 2 shows a non-limiting schematic diagram of memory of the hub devices described herein with local caches for storing data.

Referring to FIG. 2, in a particular embodiment, the hub includes a memory 201 which contains a local cache for storing data. Such data may be collected from connected data source nodes or received from other connected elements, such as NOS, or base station. In this embodiment, less time sensitive data are stored in the cache until the data can be efficiently transmitted over the network. The memory on the hub for transmission caching may include the data backhaul cache (DBH-Cache) 202 and the pull cache (PULL-Cache) 203. A subset of the DBH-Cache is the FIT-Cache 202a, which is reserved for transmissions over the fixed interval data channel. In some cases, data in the FIT-Cache is transmitted at a short (e.g. every a couple of minutes) interval, while data in the DBH-Cache is transmitted at a longer interval (e.g., every 24-48 hours). In some embodiments, the PULL-Cache is a circular data buffer where data is stored until it is overwritten. In this particular embodiment, data stored in the PULL-Cache is never transmitted unless it is requested. In this embodiment, the FIT-Cache buffer is 256 kB, the DBH-Cache buffer is 8 MB, and the PULL-Cache buffer is 64 kB. In some embodiments, the DBH-cache of 8 MB in size corresponds to approximately 1 hour of continuous transmission at 20 kbps.

In some embodiments, one or more of the FIT-Cache, DBH-Cache, and PULL-Cache includes a size in the range of 2 kB to 100 GB. In some embodiments, one or more of the FIT-Cache, DBH-Cache, and PULL-Cache includes a size in the range of 32 kB, 64 kB, 128 kB, 256 kB, 512 kB, 1 MB, 2 MB, 4 MB, 8 MB, 16 MB, 32 MB, 64 MB, 128 MB, 256 MB, 512 MB, or even bigger sizes, including increments therein. In some embodiments, one or more of the FIT-Cache, DBH-Cache, and PULL-Cache includes a size in the range of about 2 kB to about 100 GB. In some embodiments, one or more of the FIT-Cache, DBH-Cache, and PULL-Cache includes a size in the range of about 32 kB, about 64 kB, about 128 kB, about 256 kB, about 512 kB, about 1 MB, about 2 MB, about 4 MB, about 8 MB, about 16 MB, about 32 MB, about 64 MB, about 128 MB, about 256 MB, about 512 MB, or even bigger sizes, including increments therein.

In some embodiments, the hub has a local storage media to serve as a cache for data, but does not have the ability to manipulate or aggregate data packets in any way ("simple hub"). In some embodiments, the hub works as a pass-through or relay of data in its original form. Sensors/devices/data source nodes may transmit their data through the hub with wireless connection, such as a Wi-Fi, Bluetooth, LoRa, NB-IoT, or other ubiquitous physical layer connection. In some cases, the configuration database of the hub dictates how data is routed through the hub. If the hub is configured for scheduled access the incoming data is routed to a local cache for later transmission via a scheduled data uplink channel, during the hub's scheduled transmission window. If the hub is configured for real-time access, all data is routed for immediate transmission on the next available timeslot on the real-time access data channel. When data is prepared to be sent, the hub switches to the appropriate data channel as prescribed by the hub configuration database.

Data Transmission Systems

In some embodiments, the hub devices herein include a data transmission system. The data transmission system may include an electronically steered antenna as shown in FIG. 1.

In some embodiments, the data transmission system is configured to dynamically assign an M2M upload mechanism to the routed data based on the user-defined data routing and processing functions and the priority. Depending upon the time sensitivity of that data that is being sent, the M2M upload mechanisms may include at least a real-time transmission mechanism, a fixed interval mechanism, a data backhaul mechanism, and a user pull mechanism. In some embodiments, such data transmission mechanisms at the hub balance efficiency and capability with simplicity and ease of use. Such mechanism may also represent a spectrum of capabilities and present shared value propositions that are consistent between both the user and network provider while also managing user expectations. In some embodiments, real-time mode provides a transmission mode for customers that are either very sensitive to the transmission time of their data, or customers that do not want to take on any additional overhead for interacting with the network. In some cases, this mode is available with and without the usage of the hub API. In some embodiments, typical users for this mode might be time sensitive transactions such as payment processing, or users without the technical capacity to interface with the hub API. In some embodiments, the real-time mode allows a data transmission with a delay of less than 1 second, less than 0.5 seconds, less than 0.2 seconds, less than 0.1 seconds, less than 0.05 seconds, or less than 0.01 seconds, including increments therein.

In some embodiments, the FIT mode allows customers who are less sensitive about the arrival time of their data to still get their data in a regular fashion. In some cases, hubs have the capacity to send fixed amounts of data at regular time intervals. In some cases, such regular time interval is about 15 minutes. In various embodiments, the regular time interval is any duration between 1 minute and 48 hours. In some cases, data to be sent via a fixed interval transmission is sent through the hub API, where it is stored in a specified cache, optionally in the FIT-cache, until it is ready to be transmitted. In some cases, data stored in the cache can be sorted according to priorities set when sending the data through the hub API, such that more important data can jump the queue and be the first in line to be transmitted.

In some embodiments, data backhaul (DBH) transmissions service customers who have sensors that aggregate data over long periods of time. These customers may not be sensitive to the retrieval time of their data. In some cases, sensors transmit data to the hub through the hub API, where it is stored in the DBH-cache until it is ready to be transmitted. In some cases, the memory on the hub is referred to as the data backhaul cache (DBH-cache); a subset of the DBH-cache is the FIT-cache, which is reserved for transmissions over the fixed interval data channel. In some embodiments, data are stored to be transmitted every 24 hours, or at a predefined capacity. In some embodiments, the network schedules a dedicated timeslot for the hub to upload its data. For example, the user may select to upload his data every day or when data reaches 1 megabyte (MB), whichever comes first. The network may schedule a dedicated timeslot within a time of day when the network is less crowded, or find a timeslot within 1 hour of the notification that the data has reached 1 MB for data transmission. In some embodiments, during non-business hours, the amount of network capacity allocated towards data backhaul transmissions can be increased to allow for large amounts of aggregated data to be uploaded at night. In some cases, data stored in the DBH-cache, can be sorted according to priorities set when sending the data through the hub API, such that more important data can jump the queue and be the first in line to be transmitted.

In some embodiments, the data transmission system is configured to transmit the collected data, via the radio frequency communications element, to a network backhaul link for delivery to a host point based on the priority and the M2M upload mechanism.

Figure 9:
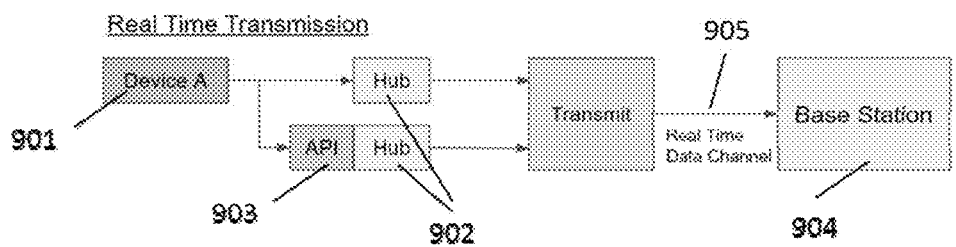
FIG. 9 shows a non-limiting schematic diagram of an M2M upload mechanism; in this case, a near real-time transmission mechanism utilized by the hub devices and networks described herein.

Referring to FIG. 9, in a particular embodiment, the hub 902 supports real time transmissions for data that is sent from the device 901 to the hub either with or without the use of the hub API 903. Any data sent through the hub without the API is automatically considered as a real time transmission. Once a real time transmission is received by the hub it is immediately relayed to a network base station 904 via a real time data channel 905.

Figure 10:
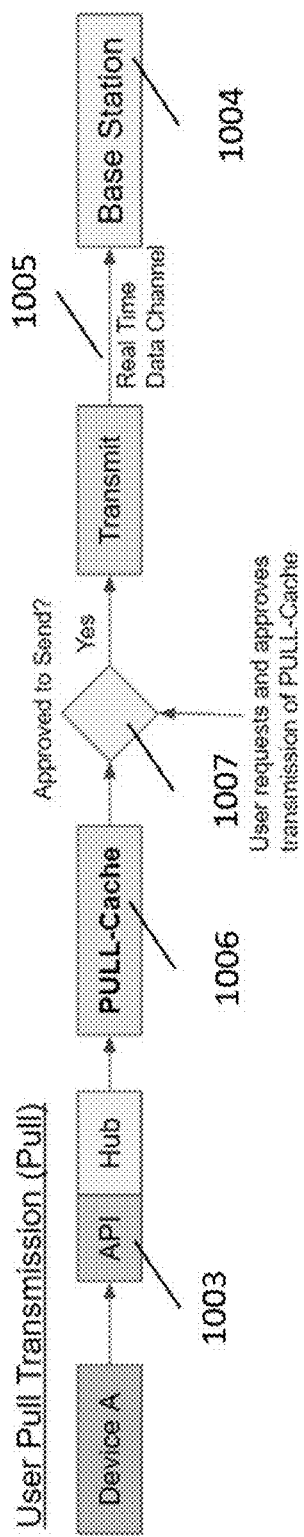
FIG. 10 shows a non-limiting schematic diagram of an M2M upload mechanism; in this case, a user-pull transmission mechanism utilized by the hub devices and networks described herein.

Referring to FIG. 10, in a particular embodiment, data send through the hub API 1003 can be tagged for routing in the PULL-Cache 1006. The PULL-Cache is a circular data buffer that retains the latest data sent to the cache. Users can request the data 1007 in the PULL-Cache and have it sent over the real time data channel. In this embodiment, the user-pull transmission mechanism allows users an option to only receive data when they request it. Data transmitted over the API is stored in a priority sorted fashion in the PULL-Cache until transmission occurs. In this particular embodiment, all data sessions utilizing the user-pull transmission mechanism originates at the hub. In other words, user-pull, in this embodiment, allow user to pull only from data already in the PULL-Cache of the hub.

Figure 11:
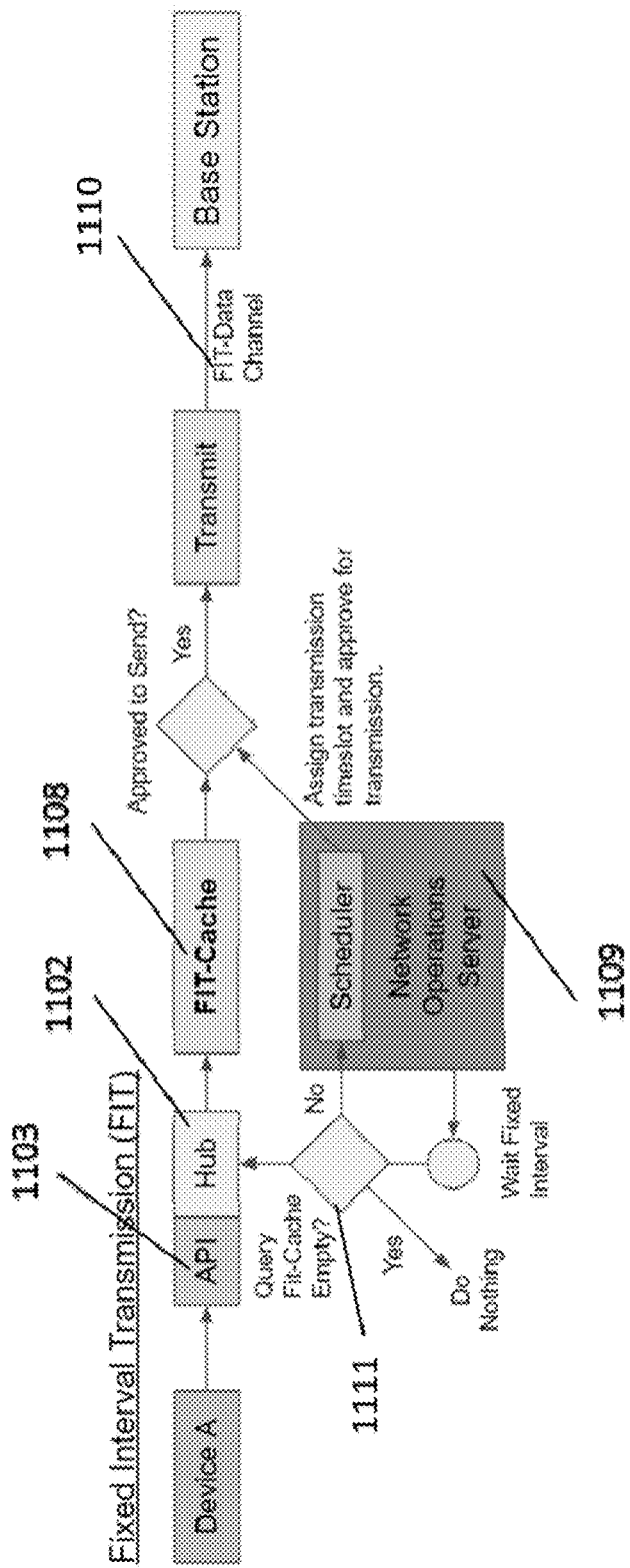
FIG. 11 shows a non-limiting schematic diagram of an M2M upload mechanism; in this case, a fixed interval transmission (FIT) transmission mechanism utilized by the hub devices and networks described herein.

Referring to FIG. 11, in a particular embodiment, the hub 1102 supports a fixed interval transmission (FIT) mechanism for data that has a moderate amount of time sensitive requirements. In this embodiment, data send through the hub API 1103 can be flagged for routing into the FIT-Cache 1108. At a fixed interval, the network operations server 1109 ping the hub 1111 for the status of the FIT-Cache. If the FIT-Cache is empty the hub does not respond. If the Fit-Cache is not empty the hub responds. The network operations server then assigns the hub a transmission time for data (e.g. a fixed amount or any known amount) on the FIT-Data channel 1110. This mode allows for routine transmissions of data at a fixed interval. Data transmitted over the API is stored in a priority sorted fashion in the FIT-Cache until transmission occurs. In this particular embodiment, all data sessions utilizing the FIT transmission mechanism originates at the hub.

Figure 12:
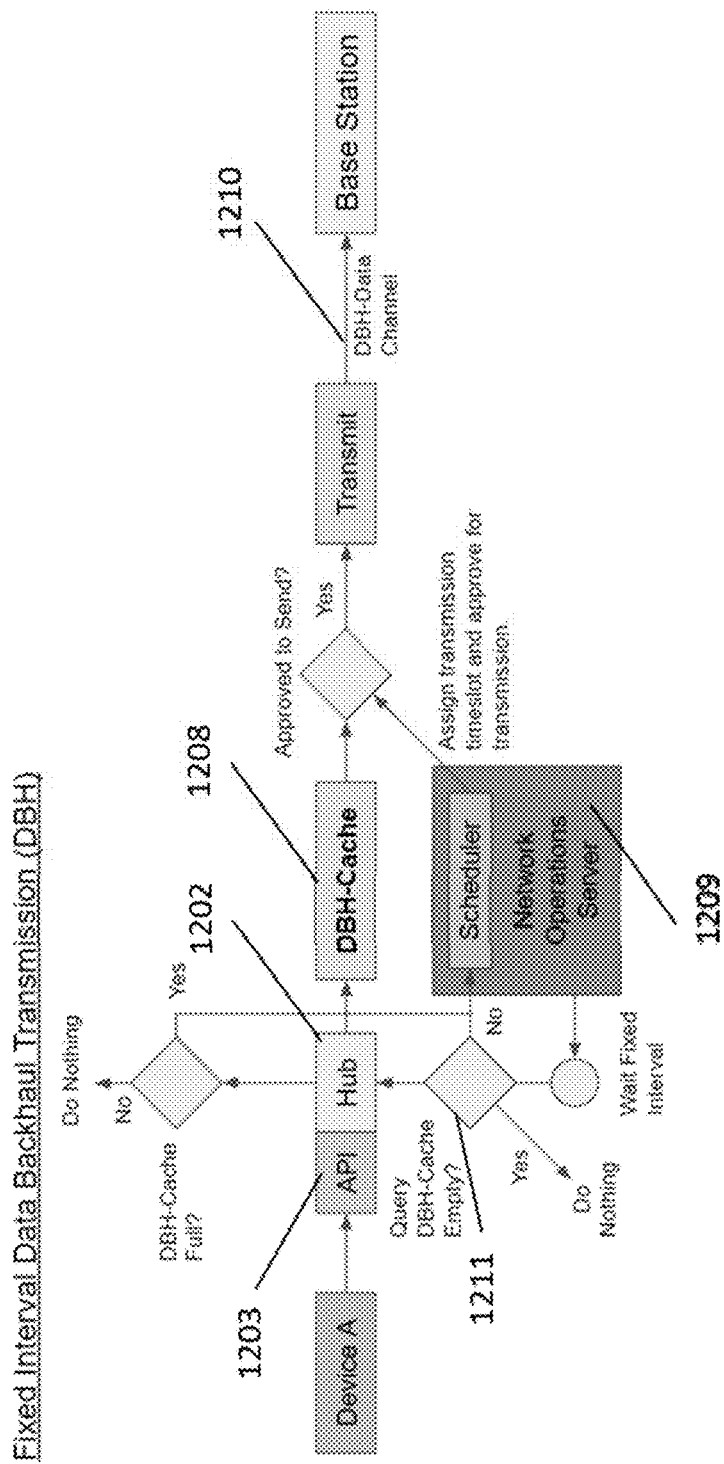
FIG. 12 shows a non-limiting schematic diagram of an M2M upload mechanism; in this case, a fixed interval data back haul transmission (DBH) transmission mechanism utilized by the hub devices and networks described herein.

Referring to FIG. 12, in a particular embodiment, a data backhaul mode is supported by the hub 1202 for data that has low time sensitivity requirements. Data sent through the hub API 1203 can be flagged for routing into the DBH-Cache 1208. At a fixed interval, the network operations server 1209 pings the hub for that status of the DBH-Cache 1211. If the DBH-Cache is near capacity, or if it has been over a preselected period of time (e.g. 24 hours) since the last DBH-Cache transmission the network operations server assign a timeslot for the hub to transmit its DBH-Cache over the DBH-Data Channel 1210. Data transmitted over the API is stored in a priority sorted fashion in the DBH-Cache until transmission occurs. In this particular embodiment, all data sessions utilizing the DBH transmission mechanism originates at the hub.

Figure 13:
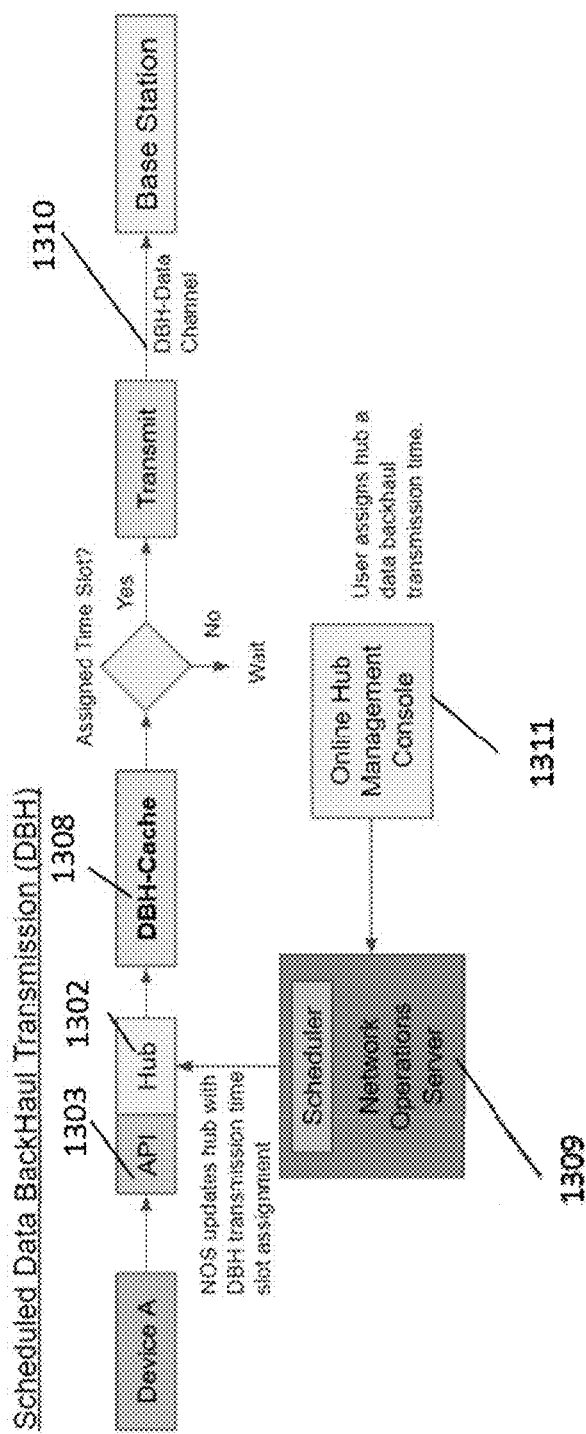
FIG. 13 shows a non-limiting schematic diagram of an M2M upload mechanism; in this case, a scheduled data back haul transmission (DBH) transmission mechanism utilized by the hub devices and networks described herein.

Referring to FIG. 13, in a particular embodiment, a data backhaul mode is supported by the hub 1302 for data that has low time sensitivity requirements. Data sent through the hub API 1303 can be flagged for routing into the DBH-Cache 1308. In this embodiment, user can assign hub a predefined transmission time slot to upload the DBH cache over the DBH-Data Channel 1310 via an online management console 1311 allowing guaranteed and consistent upload schedule for user's transmission assignments. The online management console may then communicate customized transmission time to the network operations server 1309 for scheduling time slots for data transmission. In this embodiment, data transmitted over the API is stored in a priority sorted fashion in the DBH-Cache until transmission occurs. In this particular embodiment, all data sessions utilizing the DBH transmission mechanism originates at the hub.

Such hub upload mechanisms may also enable a spectrum of various network communication modes herein. In some embodiments, the real-time transmission mechanism at the hub is implemented as the following network communication modes: a near real-time priority mode, an out-of-threshold or emergency transmission mode, an always-on dedicated channel mode, or a combination thereof. In some embodiments, the fixed interval mechanism at the hub is implemented as the following network communication modes: a store and forward mode, a fixed interval mode, or a combination thereof. In some embodiments, the data backhaul mechanism at the hub is implemented as a fixed schedule mode. In some embodiments, the user pull mechanism at the hub is implemented as an on-demand reporting mode.

In some embodiments, the network backhaul link is bandwidth constrained. The network backhaul link herein may comprise a cellular link, a satellite link, a geostationary satellite link, or a combination thereof.

In some embodiments, the data routing functionality can be collocated with the data creation devices, data source nodes, or sensor or it can be stored in a separate device (a hub) which aggregates data from multiple connected devices. In some cases, a hub presents a local physical layer network interface such as Ethernet, Bluetooth, Wi-Fi, LoRa, NB-IoT, or any other technology, including those described herein, which allow for connection to multiple local devices. Since the hub may manage network access, the connected devices or data source nodes may no longer require any specialized network access infrastructure, and are agnostic to any data routing decisions made on the hub. In some cases, data that is routed through the hub for real-time transmission is immediately routed onward, while data tagged for scheduled transmissions are timestamped and stored in a local cache on the hub until the hub's scheduled transmission window arrives. When multiple devices/nodes/sensors connect to a hub, data can be routed using per hub, per device/node/sensor, or per data packet rulesets. In some embodiments, users can define per hub data routing rulesets through an online management console, and can augment data routing functionality through interfacing with a local hub API to process and route data on a per packet basis.

Network Communication Modes

In some embodiments, the devices disclosed herein include different network communication modes. In some embodiments, the network communication modes comprise a set of specific rules for elements (e.g., devices, nodes, sensors, etc) within the network/device to communicate data and share the network channels.

In some embodiments, the systems and networks disclosed herein advantageously allow a network to deterministically allocate data channels to devices that are pre-scheduled, since the network has knowledge of when devices need to transmit data. In some embodiments, such knowledge of need for data transmission from the devices enables different network communication modes that a user can choose from.

In some embodiments, a network data channel is an information route that utilizes at least a portion of the network's bandwidth to transfer data. In some embodiments, a network channel is non-overlapping with any other channels. In some embodiments, the network channels can overlap with one or more other channels.

In some cases, the present disclosure enables a network architecture comprising specialized operations for M2M communication. A combination of hub utility (e.g., transmission modes) and network operations enable various network communication modes that users can choose from. Such network communication modes may include one or more of the following.

Near Real-Time Mode (NRT):

In some cases, the communication modes herein include a Near Real-time (NRT), or immediate priority mode. With this mode, services can spontaneously/randomly transmit data on the network. Data with immediate priority is suitable for transmission in this mode. Non-limiting examples of such data include digital payments transactions, alert messages, error messages, alarm triggers, target detections, authorizations, or the like.

Store and Forward Mode:

In some cases, the communication modes herein include a Store and Forward mode. Under this mode, the hub or devices cache data locally, which is then transmitted or backhauled over the network on a fixed schedule. Non-limiting examples of data suitable for transmission in this mode include hourly weather data dump, daily temperature updates, hourly water level updates.

On-Demand Reporting Mode:

In some cases, the communication modes herein include On-demand Reporting mode: With this mode, the user can choose to manually retrieve data from devices, wherein the network calls or fetches data from devices. Non-limiting examples of data suitable for transmission in this mode include fetching oil pressure values from valves during a safety audit, reading water levels during a high tide. In some cases, users can also choose to create 'if this, then that' type of constructs for fetching data. For example, the user may choose to fetch data from soil moisture sensors if the weather service indicates rainfall.

Fixed Interval Transmission Mode:

In some cases, the communication modes herein include Fixed Interval Transmission mode. In this mode, devices can be programmed to transmit data on a fixed time interval. Non-limiting examples of data suitable for transmission in this mode include a GPS sensor on a truck transmitting its location data once every minute.

Scheduled Transmission Mode:

In some cases, the communication modes herein include Scheduled Transmission mode. With this mode, devices can be programmed to transmit data on a fixed schedule, where the network is aware of such schedule. For example, a user schedules solar radiance sensors to read and transmit data every day at 12 pm.

Emergency or Out-of-Threshold Mode:

In some cases, the communication modes herein include Emergency or Out-of-Threshold mode. With this mode, devices can be programmed to transmit on a data uplink channel or an emergency channel on the network, if triggered by an Out-of-Threshold value on a sensor linked to the device. For examples, if carbon monoxide level reading is higher than threshold, the device connected to the carbon monoxide sensor transmits an alarm or emergency flag to make the user or user's application aware.

Always on (Dedicated Channel) Mode:

In some cases, the communication modes herein include Always on (dedicated channel) mode. In some cases, some users may demand dedicated channels on the network, if they have sensors that require a constant stream of data back and forth between devices and the NOS. For example, a user may request a dedicated always-on channel for data transmission between an unmanned camera and a video streaming application.

In some embodiments, each network mode herein is defined by a combination of hub functionality and data backhaul network channel selection. For example, "On Demand Reporting" is defined by storing local device transmission in a hub cache until they are requested by a user, at which point they are sent over the data backhaul network via a real time data channel.

Hub APIs

In some embodiments, data source nodes interact with hubs using an Application Platform Interface or Application Programmable Interface (API) provided by the hub, through a wireless or wired communications element, such as Wi-Fi, Bluetooth, LoRa, NB-IoT, or other physical layer connection. The API may allow users to specify on their nodes or devices the data payload they would like to transmit, and any data packet configuration parameters, such as transmission and data aggregation preferences, destination, and priority. In some embodiments, the configuration parameters are equivalent to API configuration parameters. In some embodiments, the data packets are processed based on data packet configuration parameters, user preferences or other data processing parameter at the hub, optionally by the API. In some embodiments, the data packet configuration parameters, combined with the user's preferences, are stored on the device configuration database, either local to the hub or remote from the hub and determine how to route incoming data packets. If the hub is configured by the user for scheduled network access, the incoming data from devices is stored on a local memory inside the hub (cache) for later transmission via a data uplink channel during the hub's scheduled transmission window. In some cases, the data uplink channel is a FIT or DBH data uplink channel. If the hub is configured for both scheduled and real-time access, all data is routed to the local cache for scheduled transmission, except incoming data flagged in the packet's configuration parameters for immediate transmission. This data is routed for transmission on the next available timeslot on the real-time access data uplink channels. If a hub is configured for real-time access only, all incoming data is routed for immediate transmission. The hub assigns appropriate real-time or scheduled access data channel for transmitting data, as prescribed by the hub configuration database or by the packet configuration parameters. In some embodiments, the data is optionally transmitted via satellite or terrestrial wireless data link to a base station or to an application or data storage.

The hub API also provides an interface between local devices and user defined functions to provide additional edge computing capabilities to enable advanced data routing and decision making. Users may define custom functions via an online web management console and deploy these functions to hubs over the air. These functions can be called by the incoming data, and are given full access to hub functionality and cache data. An example of a user defined function could be an "Out of Threshold Alert", where when data is posted to the user-defined function via the hub API, the data may be routed to a real time transmission channel if the value is outside of a threshold, or it is routed into the DBH-Cache for transmission if it is below or above a threshold value. The ability to deploy user defined functions to the hub effectively may allow IoT devices to lease the computational capacity of the hub, reducing the cost and requirements of IoT devices.

Figure 7:
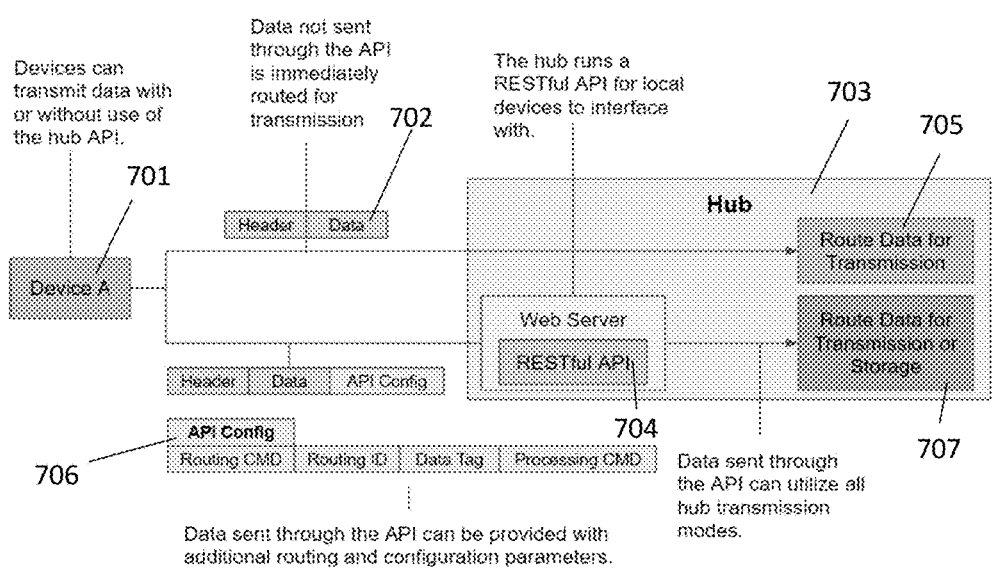
FIG. 7 shows a non-limiting schematic diagram of the hub devices disclosed herein; in this case, a hub RESTful API that allows users to customize the processing and routing of data to enable the full spectrum of hub transmission modes.

Referring to FIG. 7, in a particular embodiment, the hub 703 runs a Representational State Transfer (RESTful) API 704 which allows users to customize the processing and routing of their data, and enables the full spectrum of hub transmission modes (e.g., real time data upload; fixed interval; and data backhaul). The RESTFUL API may be the same or different API that is exposed to connected data source node. In this embodiment, the user may select to transmit device data to the hub 703 with or without use of RESTful API of the hub. Data that are not sent through the hub API 702 is immediately routed for transmission 704. The data to be transmitted through the RESTful API starts from the device 701 and can be routed 707 to different local caches corresponding to different transmission priorities so that time sensitive data can be sent for immediate transmission, while less time sensitive data can be cached locally until it can be sent. In the same embodiment, data sent through the API can also be tagged, processed, and/or aggregated before transmission. Data may be tagged for description purposes, priority queueing purposes, and/or data routing purposes. Data sent through the API may also be processed by user deployed functions. In this particular embodiment, an additional portion is temporarily or permanently added to the data sent through the API 706, which is separated from the original header or datum. The additional information includes API configuration parameters such as routing ID, data tag(s), and routing and processing commands from user-deployed functions. The API provides an interface to connect devices with customer deployed functions to process and route data on the hub and to enable various hub transmissions modes and/or network communication modes such as Out-of-Threshold Alerts. All data sent through the API is sent to its final destination from a session which originates on the hub. The hub analyzes and utilizes such API configuration parameters to tag, process and/or aggregate data. Such API configuration information, if temporarily added, may be removed before or after the data is routed to a local cache.

In some cases, to enable the various M2M network communication modes herein, the hub exposes a local API for connected devices to interface with. In some embodiments, interfacing with the hub API is not a requirement for all modes, but is required for any communications where the communication session is proxied by the hub and for high latency data transmissions and for devices looking to take advantage of hub resources. In some embodiments, the hub API provides a location for devices to deposit their data while simultaneously providing an option to tag it for routing, processing, priority, caching, and other requirements.

In some embodiments, device-gathered data may be recorded by making calls from the device to the RESTful API, e.g., a Representational State Transfer (REST)-compliant web service, hosted by the hub. A single API call may contain a single datum or a batched data set. API calls with new data may contain nothing more than the device ID and data, or they may contain custom data-handling instructions alongside the data. If they contain any custom instructions alongside the data itself, those instructions take priority over any pre-set instructions for that device, hub, or customer, for all data contained on that specific API call. As an example, an API call can be as simple as:

POST https://192.168.0.1/api/data

Body: {'device':'DEVICE ID', 'data':['12345']}

The body may contain data priority parameter. Data routed into hub caches can be stored in a priority fashion. The data priority tag specifies a specific datum's priority. For examples, EMERGENCY if the data needs to be transmitted on an emergency channel, REGULAR (or unset) otherwise. The body may contain data routing instructions that instructs the hub for routing data through the network (e.g. route to FIT-Cache for transmission). The name of a pre-defined routing scheme that may be applied to the data to be routed can be used as part of the routing instructions. The body may also contain data tags to identify specific datum for identification and endpoint routing. The body may also contain data processing parameters that allow for user and hub defined functions and capabilities to be called to act upon the received data Regardless of whether API calls are batched or not, the hub batches, compresses, and encrypts all data prior to transmitting it over the network. In addition to ensuring a secure transmission, this ensures maximally efficient use of network bandwidth, while still providing an intuitive, developer-friendly device API.

In some embodiments, the hub device herein includes one or more processors such as one or more hardware central processing units (CPUs) or general purpose graphics processing units (GPGPUs) that carry out the hub device's functions, for example the functionalities of the local connectivity system, the data processing and caching system, and/or the data transmission system. In some embodiments, the hub device herein comprises an operating system configured to perform executable instructions, for example, a real-time operating system (RTOS).

In some embodiments, the hub device is optionally connected to a computer network. In some embodiments, the hub device is optionally connected to the Internet such that it accesses the World Wide Web. In some embodiments, the hub device is optionally connected to a cloud computing infrastructure. In other embodiments, the hub device is optionally connected to an intranet. In other embodiments, the hub device is optionally connected to a data storage device.

In some embodiments, the operating system of the hub device is, for example, software, including programs and data, which manages the hub device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-® examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

In some embodiments, the hub device includes a display to send visual information to a user.

In some embodiments, the hub device includes an input device to receive information from a user.

In some embodiments, the hub disclosed herein include one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

In some embodiments, the hub devices disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

In some embodiments, the hub devices disclosed herein include one or more databases, or use of the same. In view of the disclosure provided herein, those of skill in the art will recognize that many databases are suitable for storage and retrieval of user, user's account, device/node/sensor, channel assignment, access mode selection information. In various embodiments, suitable databases include, by way of non-limiting examples, relational databases, non-relational databases, object oriented databases, object databases, entity-relationship model databases, associative databases, and XML databases. Further non-limiting examples include SQL, PostgreSQL, MySQL, Oracle, DB2, and Sybase. In some embodiments, a database is internet-based. In further embodiments, a database is web-based. In still further embodiments, a database is cloud computing-based. In other embodiments, a database is based on one or more local computer storage devices.

Network Operations Server (NOS)

In some embodiments, the NOS herein is a server, a group of servers, or a cloud computing resource that manages movement of data among data sources, hubs and users. In some embodiments, the NOS comprises a part of the IoT. In some embodiments, the NOS includes one or more of a digital processing device, a processor, a memory, a buffer, a cache, a software, a web application, a mobile application, a management console, a software module or application for channel assignment, a wired or wireless connection, a communications element, a database, and a power source. In some embodiments, the NOS serves as the "brains" of the network that monitors, controls, and generates management instructions for other elements within the network. In some embodiments, NOS provide various functionalities, often called "services", such as sharing data or resources among multiple devices, applications, or performing data analytics for a device. A NOS can serve multiple devices, data source nodes, or sensors; a NOS can be connected to multiple hubs; and a single device, data source node, sensor, or hub can use multiple NOSs. A management console may run on the same device or may connect over a network to a NOS on a different device. In some cases, the NOS is co-located at the end of a data backhaul link, such as a satellite Earth/ground station, and has direct access to the Internet backbone into which the NOS can selectively route traffic into.

In some embodiments, a data backhaul medium may be a long range data backhaul link. In some cases, the long range data backhaul link comprises a satellite data link. In further cases, the satellite data link is provided by one or more satellites in geostationary orbits. In some embodiments, a suitable geostationary orbit is an orbit of less than 45,000 km or less than 50,000 km. In a particular embodiment, a suitable geostationary orbit is an orbit of about 36,000 km. In various embodiments, the long range herein includes a range from about 30,000 km to about 50,000 km. In some cases, the long range data backhaul link comprises a terrestrial data link. In further cases, the terrestrial data link herein may comprise wired or wireless data links.

While preferred embodiments of the present subject matter have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the subject matter described herein may be employed in practicing the invention.

What is claimed is:

1. A hub device for a machine-to-machine (M2M) communications network that enables multiple communication modes for one or more data source nodes, the hub device comprising: at least one processor, a local connector, a data processor, a data cache comprising a local memory, and a data transmitter comprising a radio frequency communications element;
   a) the data processor receiving and storing user-defined data routing and processing functions;
   b) the local connector comprising a regulator that regulates connection to the one or more data source nodes, by accepting or rejecting connections, based on the user-defined data routing and processing functions, and the local connector collecting data from the one or more data source nodes or sending the data to the one or more data source nodes via an interface exposed to the one or more data source nodes;
   c) the data processor prioritizing the collected data based on the user-defined data routing and processing functions;
   d) the data cache routing the prioritized data to the local memory for storage or to the data transmitter for immediate transmission based on the priority;
   e) the data transmitter:
   i) dynamically assigning an M2M upload mechanism to the routed data based on the user-defined data routing and processing functions and the priority, the M2M upload mechanism selected from: a real-time transmission mechanism, a fixed interval mechanism, a data backhaul mechanism, and a user pull mechanism, wherein the user-defined data routing and processing functions are configured by a user via a management console and deployed to the hub device, the management console allowing the user to configure the user-defined data routing and processing functions for the real-time transmission mechanism, the fixed interval mechanism, the data backhaul mechanism, and the user pull mechanism; and
   ii) transmitting the routed data, via the radio frequency communications element, to a network backhaul link for delivery to a host point based on the priority and the M2M upload mechanism; and
   f) the local memory comprising a circular cache and a linear cache, and wherein if the routed data is dynamically assigned to the fixed interval mechanism or the data backhaul mechanism, the routed data is stored in the linear cache, if dynamically assigned to the user pull mechanism, the routed data is stored in the circular cache.

2. The hub device of claim 1, wherein the at least one processor runs a real-time operating system (RTOS).

3. The hub device of claim 1, wherein the interface comprises a Representational State Transfer (RESTful) application programming interface (API).

4. The hub device of claim 1, wherein the one or more data source nodes comprises one or more Internet-of-Things (IoT) data source nodes.

5. The hub device of claim 1, wherein the interface comprises a wireless communications element.

6. The hub device of claim 5, wherein the wireless communications element comprises one or more of: a Wi-Fi communications element, a Bluetooth communications element, a LoRa communications element, and a NB-IoT communications element.

7. The hub device of claim 1, wherein the interface comprises a wired communications element.

8. The hub device of claim 1, wherein the data processor and data cache further:
   a) receiving network data from the host point;
   b) prioritizing the network data based on the user-defined data routing and processing functions; and
   c) routing the network data to the one or more data source nodes based on the priority.

9. The hub device of claim 1, wherein the linear cache comprises a linear long-term cache and a linear short-term cache and wherein the circular cache is configured for storing data indefinitely.

10. The hub device of claim 9, wherein the linear short-term cache is a subset of the linear long-term cache.

11. The hub device of claim 1, wherein the one or more data source nodes comprise at least 10, at least 100, at least 1,000, at least 10,000, or at least 100,000 nodes.

12. The hub device of claim 1, wherein the routing the prioritized data to the local memory for storage further comprises aggregating the data to reduce packet overhead, wherein the aggregation of the data is reversible.

13. The hub device of claim 12, wherein the aggregation of the data comprises:
   a) stripping redundant information from a respective header of each datum of the data; and
   b) aggregating multiple datums of the data from a node, over a predetermined interval, to create an aggregated data packet.

14. The hub device of claim 13, wherein the prioritizing further comprises adding a tag to the aggregated data packet, the tag indicating priority.

15. The hub device of claim 1, wherein the management console comprises an IDE (integrated development environment) allowing the user to:
   a) browse a code library of data routing and processing functions;
   b) select one or more hub devices;
   c) write data routing and processing functions;
   d) compile the data routing and processing functions thereby generating the user-defined data routing and processing functions; and
   e) deploy the user-defined data routing and processing functions to the one or more selected hub devices.

16. The hub device of claim 1, wherein the user-defined data routing and processing functions are configured to perform one or more of the following:
   a) manipulate data;
   b) aggregate data;
   c) route data; and
   d) regulate interaction between the hub device and one or more of the data source nodes.

17. The hub device of claim 1, wherein the one or more data source nodes call upon the user-defined data routing and processing functions through the interface exposed to the one or more data source nodes by the hub device.

18. The hub device of claim 1, wherein the user-defined data routing and processing functions are applied to one or more of:
   a) a node,
   b) a type of node,
   c) a group of nodes,
   d) a type of data packet from a node,
   e) a type of data packet from a type of node,
   f) a type of data packet from a group of nodes, and
   g) a specific instance of a data packet from a node.

19. The hub device of claim 1, wherein the user-defined data routing and processing functions include a data origin and a data endpoint for data transmission.

20. The hub device of claim 19, wherein the data origin comprises the one or more data source nodes.

21. The hub device of claim 19, wherein the data endpoint comprises a cloud storage, a data visualization application, a data analysis application, or a data utilization application.

22. The hub device of claim 19, further comprising a session proxying system configured to proxy at least a portion of the data by a process comprising at least the following:
   a) communicate with the data processor and data cache and modify the user-defined data routing and processing functions of at least a portion of the data, such that:
      i) the data origin comprises the hub device and does not comprise the one or more data source nodes when one proxy session is included between the data origin and the data end point; and
      ii) the data endpoint comprises a network operations server (NOS) and does not comprise the one or more data source nodes when two proxy sessions are included between the data origin and the data endpoint; and
   b) communicate with the data transmitter and enable data transmission of at least a portion of the data based on the modified user-defined data routing and processing functions.

23. The hub device of claim 22, wherein the one or more data source nodes are unable to form a direct connection with the data endpoint for data transmission.

24. The hub device of claim 22, wherein modification of the user-defined data routing and processing functions comprises reducing data size of at least a portion of the data.

25. The hub device of claim 1, wherein the real-time transmission mechanism is implemented as a near real-time priority mode, an out-of-threshold or emergency transmission mode, or an always-on dedicated channel mode.

26. The hub device of claim 1, wherein the fixed interval mechanism is implemented as a store and forward mode or a fixed interval mode.

27. The hub device of claim 1, wherein the data backhaul mechanism is implemented as a fixed schedule mode.

28. The hub device of claim 1, wherein the user pull mechanism is implemented as an on-demand reporting mode.

29. A hub device for a machine-to-machine (M2M) communications network that enables multiple communication modes for one or more data source nodes, the hub device comprising: at least one processor, a local connector, a data processor and data cache comprising a local memory, and a data transmitter comprising a radio frequency communications element;

a) the local connector collecting data from the one or more data source nodes or sending the data to the one or more data source nodes via an interface exposed to the one or more data source nodes;
b) the data processor and data cache:
  i) receiving and storing user-defined data routing and processing functions;
  ii) prioritizing the collected data based on the user-defined data routing and processing functions;
  iii) routing the prioritized data to the local memory for storage or to the data transmitter for immediate transmission based on the priority;
  iv) receiving aggregated network data from a host point;
  v) prioritizing and disassembling the aggregated network data based on the user-defined data routing and processing functions;
  vi) routing the disassembled network data to the one or more data source nodes based on the priority of the disassembled network data;
c) the data transmitter:
  i) dynamically assigning an M2M upload mechanism to the routed data based on the user-defined data routing and processing functions and the priority, the M2M upload mechanism selected from: a real-time transmission mechanism, a fixed interval mechanism, a data backhaul mechanism, and a user pull mechanism; and
  ii) transmitting the data, via the radio frequency communications element, to a network backhaul link for delivery to the host point based on the priority and the M2M upload mechanism; and
d) the local memory comprising a circular cache and a linear cache, and wherein if the routed data is dynamically assigned to the fixed interval mechanism or the data backhaul mechanism, the routed data is stored in the linear cache, if dynamically assigned to the user pull mechanism, the routed data is stored in the circular cache.

* * * * *